US010285343B2

(12) United States Patent
Whalley

(10) Patent No.: US 10,285,343 B2
(45) Date of Patent: May 14, 2019

(54) CENTER PIVOT IRRIGATION SYSTEM WITH PRESSURE AND LOCATION BASED FLOW AND PLACEMENT CONTROL

(71) Applicant: TRIMBLE NAVIGATION LIMITED, Sunnyvale, CA (US)

(72) Inventor: Mark Jonathan Whalley, Christchurch (NZ)

(73) Assignee: TRIMBLE INC., Sunnyvale, CA (US)

( * ) Notice: Subject to any disclaimer, the term of this patent is extended or adjusted under 35 U.S.C. 154(b) by 111 days.

(21) Appl. No.: 14/705,039

(22) Filed: May 6, 2015

(65) Prior Publication Data

US 2016/0324084 A1 Nov. 10, 2016

(51) Int. Cl.

| | |
|---|---|
| ***A01G 25/16*** | (2006.01) |
| ***A01G 25/09*** | (2006.01) |
| ***B05B 1/20*** | (2006.01) |
| ***B05B 1/30*** | (2006.01) |

(52) U.S. Cl.

CPC .......... *A01G 25/16* (2013.01); *A01G 25/092* (2013.01); *A01G 25/165* (2013.01); *B05B 1/20* (2013.01); *B05B 1/30* (2013.01)

(58) Field of Classification Search

CPC .... A01G 25/16; A01G 25/092; A01G 25/165; B05B 1/30; B05B 1/20

USPC ......... 239/728, 730, 731, 63, 67, 69, 73, 99, 239/100, 101

See application file for complete search history.

(56) References Cited

U.S. PATENT DOCUMENTS

| | | | | |
|---|---|---|---|---|
| 4,142,684 A * | 3/1979 | Schweitzer | B05B 1/3053 | 118/302 |
| 4,186,880 A * | 2/1980 | Jacobi | A01G 25/16 | 239/729 |
| 5,048,755 A * | 9/1991 | Dodds | A01G 25/16 | 137/78.2 |
| 5,134,961 A * | 8/1992 | Giles | A01M 7/0089 | 118/300 |
| 5,246,164 A * | 9/1993 | McCann | A01B 79/005 | 239/11 |
| 5,255,857 A * | 10/1993 | Hunt | A01G 25/092 | 239/731 |
| 5,279,068 A * | 1/1994 | Rees | A01B 69/001 | 180/169 |
| 5,678,771 A * | 10/1997 | Chapman | A01G 25/092 | 239/727 |

(Continued)

*Primary Examiner* — Viet Le
*Assistant Examiner* — Steven M Cernoch
(74) *Attorney, Agent, or Firm* — Marsh Fischmann & Breyfogle LLP; Kent A. Lembke

(57) ABSTRACT

A center pivot irrigation system is described that includes a controller that makes use of a particular flow rate of input water to deliver a consistent depth of irrigation to user-defined areas under a pivot irrigator. The controller operates to pulse control valves for the nozzles/sprinkler heads on and off as the sprinkler arm rotates. The valve pattern along the span of the sprinkler arm is chosen during each operating cycle such that the total water flow through all the open valves matches the flow rate of the input or supply water to the pivot irrigator. To ensure a consistent depth, the speed is changed during valve duty cycles to match the density of open valves in the sprinkler arm. To ensure a consistent distribution under the sprinkler arm, each valve is monitored to ensure that the valves are given the same proportional share of the input water.

12 Claims, 28 Drawing Sheets

(56) References Cited

U.S. PATENT DOCUMENTS

| | | | | |
|---|---|---|---|---|
| 6,085,999 | A * | 7/2000 | Gerdes | A01G 25/092<br>239/66 |
| 8,849,467 | B2 * | 9/2014 | Korus | A01G 25/092<br>239/722 |
| 8,849,468 | B2 * | 9/2014 | Abts | A01G 25/092<br>239/1 |
| 2002/0066810 | A1 * | 6/2002 | Prandi | A01G 25/092<br>239/728 |
| 2012/0228395 | A1 * | 9/2012 | Needham | F16K 31/0606<br>239/11 |

* cited by examiner

Schedule of 35 Valves with Flow Rates

| Valve | 1 | 2 | 3 | 4 | 5 | 6 | 7 | 8 | 9 | 10 |
|---|---|---|---|---|---|---|---|---|---|---|
| Flowrate | 3.8 | 4.6 | 5.4 | 6.2 | 7 | 7.8 | 8.6 | 9.4 | 10.2 | 11 |

Target Flow rate of 300, creates a Divisor of 3 and a Velocity of 49%

| Target | 300 | Divisor | 3 | Velocity | 49% |
|---|---|---|---|---|---|

First Cycle. Valves sorted in Inverse order with a steps driven by the Divisor (3)

| Sort Order | 24 | 12 | 35 | 23 | 11 | 34 | 22 | 10 | 33 | 21 |
|---|---|---|---|---|---|---|---|---|---|---|

For the first cycle each valve step is shown as a separate row.

Next valve
Next valve
Next valve
Next valve
Next valve

CONTINUED FROM FIG.16A

| 11 | 12 | 13 | 14 | 15 | 16 | 17 | 18 | 19 | 20 | 21 | 22 | 23 | 24 |
|---|---|---|---|---|---|---|---|---|---|---|---|---|---|
| 11.8 | 12.6 | 13.4 | 14.2 | 15 | 15.8 | 16.6 | 17.4 | 18.2 | 19 | 19.8 | 20.6 | 21.4 | 22.2 |
| 9 | 32 | 20 | 8 | 31 | 19 | 7 | 30 | 18 | 6 | 29 | 17 | 5 | 28 |
| | | | | | | | | | | | | -21.4 | |

CONTINUED FROM FIG.16B

| 25 | 26 | 27 | 28 | 29 | 30 | 31 | 32 | 33 | 34 | 35 | Total |
|---|---|---|---|---|---|---|---|---|---|---|---|
| 23 | 23.8 | 24.6 | 25.4 | 26.2 | 27 | 27.8 | 28.6 | 29.4 | 30.2 | 31 | 609.00 |
| | | | | | | | | | | | |
| 16 | 4 | 27 | 15 | 3 | 26 | 14 | 2 | 25 | 13 | 1 | 609.00 |
| | | | | | | | | | | -31 | 578.00 |
| | | | | | | | -28.6 | | | | 549.40 |
| | | | | -26.2 | | | | | | | 523.20 |
| | -23.8 | | | | | | | | | | 499.40 |
| | | | | | | | | | | | 478.00 |

CONTINUED FROM FIG.16A

| | | | |
|---|---|---|---|
| Next valve | | | |
| Next valve | | | |
| Next valve | | | |
| Next valve | | | |
| Next valve | | | -9.4 |
| Next valve | | -7 | |
| Next valve | -4.6 | | |
| Next valve | | | |
| Next valve | | | |
| Next valve | | | |
| Next valve | | | |
| Next valve | | | |

The Total at 298.6 is now less than the Target of 300 so the select process stops

CONTINUED FROM FIG.16B

CONTINUED FROM FIG.16D

CONTINUED FROM FIG.16C

CONTINUED FROM FIG.16E 459.00
442.40
428.20
416.40
407.00
400.00
395.40
395.40
-27.8
367.60
-25.4
342.20
-23
319.20
298.60

CONTINUED FROM FIG.16D

The first cycle has resulted in these flow rates, and each of the overridden valves

| | | | | | | | | | | |
|---|---|---|---|---|---|---|---|---|---|---|
| Result Flow Rates | 3.8 | 0 | 5.4 | 6.2 | 0 | 7.8 | 8.6 | 0 | 10.2 | 11 |
| Override Counter | 0 | 1 | 0 | 0 | 1 | 0 | 0 | 1 | 0 | 0 |

Second Cycle. Valves sorted firstly by the counter (so valves that missed the last cycle

| | | | | | | | | | | |
|---|---|---|---|---|---|---|---|---|---|---|
| Next Cycle Sort | 8 | 31 | 19 | 7 | 30 | 18 | 6 | 29 | 17 | 5 |
| Override Select | -3.8 | | -5.4 | -6.2 | | -7.8 | -8.6 | | -10.2 | -11 |

The second cycle has resulted in these flow rates, and each of the overridden valves
While the last valve has now been overridden two times, all other valves have been

| | | | | | | | | | | |
|---|---|---|---|---|---|---|---|---|---|---|
| Result Flow Rates | 0 | 4.6 | 0 | 0 | 7 | 0 | 0 | 9.4 | 0 | 0 |
| Override Counter | 1 | 1 | 1 | 1 | 1 | 1 | 1 | 1 | 1 | 1 |

CONTINUED FROM FIG.16E has incremented its counter

| | | | | | | | | | | | | | |
|---|---|---|---|---|---|---|---|---|---|---|---|---|---|
| 0 | 12.6 | 13.4 | 0 | 15 | 15.8 | 0 | 17.4 | 18.2 | 0 | 19.8 | 0 | 0 | 22.2 |
| 1 | 0 | 0 | 1 | 0 | 0 | 1 | 0 | 0 | 1 | 0 | 1 | 1 | 0 |

get priority at this cycle) and then in Inverse order with a steps driven by the Divisor (3)

| | | | | | | | | | | | | | |
|---|---|---|---|---|---|---|---|---|---|---|---|---|---|
| 28 | 16 | 4 | 27 | 15 | 3 | 26 | 14 | 2 | 25 | 13 | 35 | 24 | 12 |
| | -12.6 | -13.4 | | -15 | -15.8 | | -17.4 | -18.2 | | -19.8 | | | -22.2 |

CONTINUED FROM FIG.16G have incremented their counter overridden once

| | | | | | | | | | | | | | |
|---|---|---|---|---|---|---|---|---|---|---|---|---|---|
| 11.8 | 0 | 0 | 14.2 | 0 | 0 | 16.6 | 0 | 0 | 19 | 0 | 20.6 | 21.4 | 0 |
| 1 | 1 | 1 | 1 | 1 | 1 | 1 | 1 | 1 | 1 | 1 | 1 | 1 | 1 |

CONTINUED FROM FIG.16F

| | | | | | | | | | | | |
|---|---|---|---|---|---|---|---|---|---|---|---|
| 0 | 0 | 24.6 | 0 | 0 | 27 | 0 | 0 | 29.4 | 30.2 | 0 | 298.60 |
| 1 | 1 | 0 | 1 | 1 | 0 | 1 | 1 | 0 | 0 | 1 | |

| | | | | | | | | | | |
|---|---|---|---|---|---|---|---|---|---|---|
| 34 | 23 | 11 | 33 | 22 | 10 | 32 | 21 | 9 | 1 | 20 |
| | | -24.6 | | | -27 | | | -29.4 | -30.2 | -31 |

CONTINUED FROM FIG.16H

| | | | | | | | | | | | |
|---|---|---|---|---|---|---|---|---|---|---|---|
| 23 | 23.8 | 0 | 25.4 | 26.2 | 0 | 27.8 | 28.6 | 0 | 0 | 0 | 279.40 |
| 1 | 1 | 1 | 1 | 1 | 1 | 1 | 1 | 1 | 1 | 2 | |

CONTINUED FROM FIG.16G

Third Cycle. Again Valves sorted firstly by the counter and then in Inverse Divisor

| | | | | | | | | | | |
|---|---|---|---|---|---|---|---|---|---|---|
| Next Cycle Sort | 23 | 11 | 34 | 22 | 10 | 33 | 21 | 9 | 32 | 20 |
| Override Select | | -4.6 | | | -7 | | | -9.4 | | |

The third cycle has resulted in these flow rates, and each of the overridden valves

| | | | | | | | | | | |
|---|---|---|---|---|---|---|---|---|---|---|
| Result Flow Rates | 3.8 | 0 | 5.4 | 6.2 | 0 | 7.8 | 8.6 | 0 | 10.2 | 11 |
| Override Counter | 1 | 2 | 1 | 1 | 2 | 1 | 1 | 2 | 1 | 1 |

Fourth Cycle. Again Valves sorted firstly by the counter and then in Inverse Divisor

| | | | | | | | | | | |
|---|---|---|---|---|---|---|---|---|---|---|
| Next Cycle Sort | 18 | 35 | 12 | 6 | 29 | 17 | 11 | 23 | 5 | 16 |
| Override Select | -3.8 | | -5.4 | -6.2 | | -7.8 | -8.6 | | -10.2 | -11 |

The fourth cycle has resulted in these flow rates, and each of the overridden valves

| | | | | | | | | | | |
|---|---|---|---|---|---|---|---|---|---|---|
| Result Flow Rates | 0 | 4.6 | 0 | 0 | 7 | 0 | 0 | 9.4 | 0 | 0 |
| Override Counter | 2 | 2 | 2 | 2 | 2 | 2 | 2 | 2 | 2 | 2 |

CONTINUED FROM FIG.16H stepped order

| 8 | 31 | 19 | 7 | 30 | 18 | 6 | 29 | 17 | 5 | 28 | 16 | 4 | 27 |
|---|---|---|---|---|---|---|---|---|---|---|---|---|---|
| -11.8 | | | -14.2 | | | -16.6 | | | -19 | | -20.6 | -21.4 | |

have incremented their counters

| 0 | 12.6 | 13.4 | 0 | 15 | 15.8 | 0 | 17.4 | 18.2 | 0 | 19.8 | 0 | 0 | 22.2 |
|---|---|---|---|---|---|---|---|---|---|---|---|---|---|
| 2 | 1 | 1 | 2 | 1 | 1 | 2 | 1 | 1 | 2 | 1 | 2 | 2 | 1 |

CONTINUED FROM FIG.16J stepped order

| 34 | 10 | 4 | 28 | 15 | 9 | 22 | 3 | 14 | 33 | 8 | 27 | 21 | 2 |
|---|---|---|---|---|---|---|---|---|---|---|---|---|---|
| | -12.6 | -13.4 | | -15 | -15.8 | | -17.4 | -18.2 | | -19.8 | | | -22.2 |

have incremented their counters

| 11.8 | 0 | 0 | 14.2 | 0 | 0 | 16.6 | 0 | 0 | 19 | 0 | 20.6 | 21.4 | 0 |
|---|---|---|---|---|---|---|---|---|---|---|---|---|---|
| 2 | 2 | 2 | 2 | 2 | 2 | 2 | 2 | 2 | 2 | 2 | 2 | 2 | 2 |

Figure 16L:
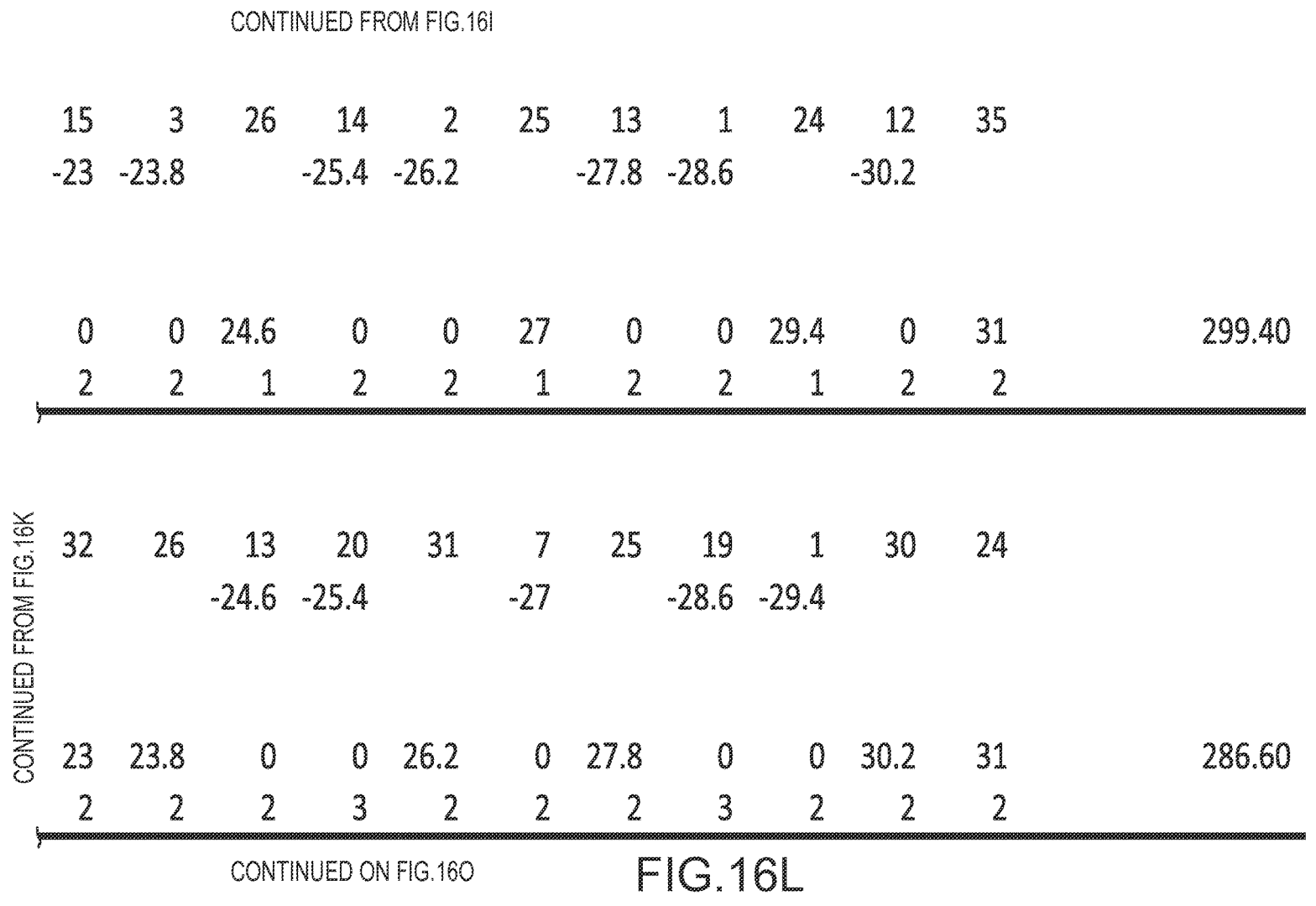

CONTINUED FROM FIG.16I

| | | | | | | | | | | | |
|---|---|---|---|---|---|---|---|---|---|---|---|
| 15 | 3 | 26 | 14 | 2 | 25 | 13 | 1 | 24 | 12 | 35 | |
| -23 | -23.8 | | -25.4 | -26.2 | | -27.8 | -28.6 | | -30.2 | | |
| 0 | 0 | 24.6 | 0 | 0 | 27 | 0 | 0 | 29.4 | 0 | 31 | 299.40 |
| 2 | 2 | 1 | 2 | 2 | 1 | 2 | 2 | 1 | 2 | 2 | |

CONTINUED FROM FIG.16K

| | | | | | | | | | | | |
|---|---|---|---|---|---|---|---|---|---|---|---|
| 32 | 26 | 13 | 20 | 31 | 7 | 25 | 19 | 1 | 30 | 24 | |
| | | -24.6 | -25.4 | | -27 | | -28.6 | -29.4 | | | |
| 23 | 23.8 | 0 | 0 | 26.2 | 0 | 27.8 | 0 | 0 | 30.2 | 31 | 286.60 |
| 2 | 2 | 2 | 3 | 2 | 2 | 2 | 3 | 2 | 2 | 2 | |

CONTINUED FROM FIG.16J

Fifth Cycle. Again Valves sorted firstly by the counter and then in Inverse Divisor

| | | | | | | | | | | |
|---|---|---|---|---|---|---|---|---|---|---|
| Next Cycle Sort | 33 | 22 | 11 | 32 | 21 | 10 | 31 | 20 | 9 | 30 |
| Override Select | | | -5.4 | | | -7.8 | | | -10.2 | |

The fifth cycle has resulted in these flow rates, and each of the overridden valves

| | | | | | | | | | | |
|---|---|---|---|---|---|---|---|---|---|---|
| Result Flow Rates | 3.8 | 4.6 | 0 | 6.2 | 7 | 0 | 8.6 | 9.4 | 0 | 11 |
| Override Counter | 2 | 2 | 3 | 2 | 2 | 3 | 2 | 2 | 3 | 2 |

Summarizing the Valve cycles

| | | | | | | | | | | | |
|---|---|---|---|---|---|---|---|---|---|---|---|
| Cycle 1 | 3.8 | - | 5.4 | 6.2 | - | 7.8 | 8.6 | - | 10.2 | 11.0 | - |
| Cycle 2 | - | 4.6 | - | - | 7.0 | - | - | 9.4 | - | - | 11.8 |
| Cycle 3 | 3.8 | - | 5.4 | 6.2 | - | 7.8 | 8.6 | - | 10.2 | 11.0 | - |
| Cycle 4 | - | 4.6 | - | - | 7.0 | - | - | 9.4 | - | - | 11.8 |
| Cycle 5 | 3.8 | 4.6 | - | 6.2 | 7.0 | - | 8.6 | 9.4 | - | 11.0 | 11.8 |

CONTINUED FROM FIG.16K stepped order

| 19 | 8 | 29 | 18 | 7 | 28 | 17 | 6 | 27 | 16 | 5 | 26 | 15 | 4 |
|---|---|---|---|---|---|---|---|---|---|---|---|---|---|
| | -12.6 | | | -15 | | | -17.4 | | -19 | -19.8 | | -21.4 | -22.2 |

have incremented their counters

| 11.8 | 0 | 13.4 | 14.2 | 0 | 15.8 | 16.6 | 0 | 18.2 | 0 | 0 | 20.6 | 0 | 0 |
|---|---|---|---|---|---|---|---|---|---|---|---|---|---|
| 2 | 3 | 2 | 2 | 3 | 2 | 2 | 3 | 2 | 3 | 3 | 2 | 3 | 3 |

CONTINUED ON FIG.16O

CONTINUED FROM FIG.16M

| 12.6 | 13.4 | - | 15.0 | 15.8 | - | 17.4 | 18.2 | - | 19.8 | - | - | 22.2 |
|---|---|---|---|---|---|---|---|---|---|---|---|---|
| - | - | 14.2 | - | - | 16.6 | - | - | 19.0 | - | 20.6 | 21.4 | - |
| 12.6 | 13.4 | - | 15.0 | 15.8 | - | 17.4 | 18.2 | - | 19.8 | - | - | 22.2 |
| - | - | 14.2 | - | - | 16.6 | - | - | 19.0 | - | 20.6 | 21.4 | - |
| - | 13.4 | 14.2 | - | 15.8 | 16.6 | - | 18.2 | - | - | 20.6 | - | - |

FIG.16N

CENTER PIVOT IRRIGATION SYSTEM WITH PRESSURE AND LOCATION BASED FLOW AND PLACEMENT CONTROL

BACKGROUND

1. Field of the Invention

The present invention generally relates to systems and methods for controlling operation of a center pivot irrigation system and, more particularly, to a center pivot irrigation system that is configured to provide constant depth of water application in selected areas of irrigated land (e.g., to avoid application of valuable water on non-productive areas of a field, avoid watering a road, and so on) even with changing water flow and/or pressures being input by the center pivot irrigation system pump(s). The center pivot irrigation system is controlled so as to irrigate the farmer-designated or desired areas of the field, which may cause more or less of the irrigator's nozzles to be used but doing so with a "constant" flowrate so that the number of valves open at any time adds up to approximately the same total flow.

2. Relevant Background

In many areas of the world, the agricultural industry relies upon effective irrigation to raise crops. Irrigation may be used due to limited rainfall or rainfall that is not adequate for a particular crop. Further, irrigation may be utilized due to the variability in the timing of rainfall as many crops require a relatively consistent amount of water over their growing period.

Center pivot irrigation is one of the most water-efficient irrigation techniques. Center pivot irrigation is a form of overhead sprinkler irrigation that makes use of a long sprinkler arm formed of several segments of pipe joined together and supported by trusses. The pipe segments are mounted on wheeled towers each typically driven by an electric motor. Sprinklers or sprinkler heads are spaced apart along the length or span of the sprinkler arm. The sprinkler arm is centrally anchored such that the sprinkler arm moves in a circular pattern, and water is fed into the sprinkler arm at the center of the circle via one, two, or more pumps that may be positioned anywhere between the sprinkler arm and a water source such as an aquifer.

The outside set of wheels on the arm may set the master pace for the rotation such as once every three days. The inner sets of wheels can be mounted at hubs or towers between two pipe segments, and angle sensors can be used to detect when the bend at the joint between the two segments exceeds a certain maximum threshold as an indication of when the electric motor driving the inner wheel sets should be rotated to keep the pipe segments generally aligned along the arm span. Center pivot sprinkler arms are typically less than about 1600 feet (or 500 meters) in length (i.e., irrigated circle radius) with a common size being 440 feet (or a quarter mile or 400 meters) length or circle radius, but many pivot sprinkler arms may be much longer than 500 meters in length.

Most center pivot irrigation systems use sprinklers that hang down from the sprinkler arm pipe segments so that the sprinkler heads are positioned a few feet above the ground or crop so as to limit evaporative losses and wind drift. There are many different sprinkler head or nozzle configurations that may be used including a static plate, a moving plate, and so on with a rotator-style pivot applicator sprinkler head or nozzle being one of the more popular in present irrigation systems. The rotator-style sprinkler head or nozzle is adapted to work properly with input water at a particular pressure (or within a desired range and not very well or at all if too far below this pressure), and a pressure regulator may be provided upstream of each nozzle or sprinkler head to ensure that each is operating at the correct design pressure (not over pressurized).

It is typically an operational goal of a center pivot irrigation system to provide uniform application of water, which may include effluent, chemicals, and fertilizers, and to avoid applying too much water in one application (e.g., by running too slowly) so as to reduce run-off and leaching. To achieve such uniform application, the center pivot irrigation system generally requires an even emitter flow rate across the length or span of the sprinkler arm. Since the outer-most pipe segments and wheeled towers travel farther in a given time period (e.g., at a higher speed) than the inner-most pipe segments and wheeled towers, nozzle sizes may be smallest at the inner spans and increase in size with distance from the pivot point such that a greater flow of water is output at positions on the sprinkler arm that are moving the fastest (and a lower flow of water is output at positions on the sprinkler arm that are moving the slowest).

While center pivot irrigation systems are considered to be highly efficient systems that are useful in conserving water, there remains a number of challenges associated with their use to irrigate crops. One challenge is that the amount of water available to the center pivot irrigation system may vary over the growing season. For example, water may initially be available at a flow rate of 550 to 600 gallons per minute (GPM) but later drop down to 400 to 450 GPM. Presently, one solution to this problem of varying input water flow rates is to change out the nozzle sizes along the entire length of the sprinkler arm to continue to have uniform output flows and to have nozzles that operate well at lower pressures. Keeping a separate set of nozzles and changing them out midseason can be very expensive and time consuming. Another approach to addressing this problem is to utilize a variable speed pump(s), which enable valve-based irrigation zones to be chosen easily as input flow rate is not a concern. However, a variable speed pump does not help reduce problems with changing water availability, and such pumps are much more expensive to use and maintain than more commonly available pumps. Hence, there remains a need for an improved center pivot irrigation system that can handle varying input flow rates or water availability.

Another challenge to using center pivot irrigation systems is how to selectively water a field to leave some portions dry or non-irrigated. For example, a farmer may have a field that has one or more obstacles or areas where no crops are planted such as a rocky area or a road, and it may be a waste of precious and expensive water to irrigate all areas of the field uniformly as is presently the case with many center pivot irrigation system. One could turn off a nozzle or two, but obstacles generally are not circular or ring-shaped. This challenge also arises because certain portions of a field simply are not as productive as other areas (e.g., due to soil conditions or other reasons), and the farmer may wish to leave these areas of the field fallow for business reasons and only apply water to the best producing areas within a field (e.g., the farmer wants to be able to pick and choose where to irrigate). Often, the areas where irrigation is not as desirable will be very irregularly shaped and may be located in various, spaced-apart locations within the circular area covered by a center pivot irrigation system. Presently, there is no good solution on how to selectively irrigate a field with a center pivot irrigation system, and there remains a need for an improved control method or irrigation system that allows selective watering of areas or portions covered by a center pivot irrigation system while still maintaining uniform flow rates through the sprinkler arm (e.g., without using a variable speed pump(s)).

SUMMARY

Briefly, a center pivot irrigation system is described that includes a controller (e.g., hardware and software for controlling operations of the system) that makes use of a particular flow rate of input water (provided by pumps or other water supply devices and that may vary over a growing/irrigation season) to deliver a consistent depth of irrigation to user (e.g., a farmer) defined areas under a pivot irrigator or its sprinkler arm. To this end, the controller may operate to pulse control valves for the nozzles/sprinkler heads on and off as the sprinkler arm rotates in the field. The valve open/close pattern along the span or length of the sprinkler arm is chosen during each operating cycle (e.g., each valve duty cycle such as a time period in the range of 20 to 90 seconds or the like) such that the total water flow through all the open valves (and associated nozzles) is as close as practicable to the flow rate of the input or supply water to the pivot irrigator. To ensure a consistent depth, the pivot irrigator's rotation speed is set during each valve duty cycle to match the density of open valves in the sprinkler arm (e.g., speed is increased when the valve open/close pattern is more dense and speed is decreased when the valve open/close pattern is less dense). To ensure a consistent distribution across the irrigated area(s)/zone(s) under the sprinkler arm, each valve is monitored to ensure that the valves (and associated nozzles/sprinkler heads) are given the same proportional share of the input water.

In practice, the center pivot irrigation system is controlled so as to irrigate the farmer-designated or desired areas of the field. The controller acts to cause more or less of the irrigator's nozzles to be used but doing so with a "constant" flow rate so that the number of valves open at any time adds up to approximately the same total flow. Use of the term or phrase "constant flow" should be understood to be within a range of flow rates about a target or goal rate. In part, this is because the irrigation system's controller is designed to determine the incoming flow rate based on water pressure, and, therefore, the controller can handle changes in the flow rate through the sprinkler arm over time. However, in a typical irrigating operation, the flow rate is not changing frequently or on an ongoing basis, the flow rate, instead, largely remains "constant" with fixed drive pumps providing the input flow or supply water to the sprinkler arm, and, from time-to-time (or more infrequently), the flow rate may change with the controller of the system compensating for such a change.

More particularly, a center pivot irrigation system is provided that is configured to provide a uniform (or substantially smooth) flow rate of water and a constant (or substantially constant) application depth. The system includes a sprinkler arm (or pivot irrigator) including one or more pipe segments that are fluidically coupled with each other including a plurality of spaced apart nozzles. The system also includes a plurality of towers supporting the sprinkler arm, and a drive motor (e.g., an electric motor) is provided on each of the wheeled towers to drive wheels on the tower to rotate the sprinkler arm about a center pivot axis at a rotation speed. The system also includes a water supply providing input water to the sprinkler arm.

Further, the system includes a plurality of control valves (e.g., solenoid valves) that are each positioned on the sprinkler arm upstream of a set of the nozzles (e.g., one, two, or more nozzles that may be provided on each sprinkler head). The system also includes a controller running a valve operation module that, for each of a plurality of sequential valve duty cycles (e.g., 20 to 60 second cycles), generates a valve pattern defining a group of the nozzles to discharge the input water from the sprinkler arm and transmits control signals to the control valves causing the control valves associated with the group of nozzles to open (e.g., to cause water to be discharged or sprayed from this particular group of nozzles for the duration (e.g., 30 seconds) of the present valve duty cycle).

The group of nozzles defined by the valve pattern typically differs for each of the valve duty cycles to provide a uniform application depth of water along the length of the sprinkler arm (or at least portions over an irrigation zone). In some cases, at least one fourth of the nozzles are closed during each of the valve duty cycles while other embodiments may oversize the nozzles such that one third (or more such as up to two thirds or more) of the nozzles may be closed to maintain the uniform flow rate through the sprinkler arm. For example, some systems may use an oversizing of nozzles to three times the maximum pump capacity to provide flexibility in exclusion zones, and, in such cases, two thirds of the nozzles may be closed to provide uniform flow. The controller may generate the valve pattern for each of the valve duty cycles so as to output the input water at a flow rate within a predefined range of flow rates, e.g., the predefined range of flow rates may have minimum and maximum flow rates that differ by less than 100 Liters Per Minute (LPM). In some cases, the logic implemented by the controller may set an upper flow rate and act to ensure that the total volume of the nozzles is no greater than this upper flow rate setting. The minimum flow rate will then be no less than the maximum flow rate minus the flow controlled by the largest valve in the sprinkler arm.

In some implementations, a flow meter and a pressure gauge are provided for measuring a flow rate of the input water and a pressure of the input water, and the valve pattern is generated by the controller for each of the valve duty cycles to provide the output of the input water at the flow rate based on at least one of the measured flow rate and the measured pressure of the input water. For example, some embodiments may only work off pressure or a fixed flow. Note, though, in many embodiments, pressure-based controls are optional, and if the pressure operating levels are not set, the controller will drive the system to a user-prescribed flow rate. In these or other implementations, the system may include a location monitor (e.g., a GNSS receiver or the like) on the sprinkler arm determining a current geographic location of the sprinkler arm, and the controller generates the valve pattern for each valve duty cycle based on the current geographic location of the sprinkler arm. In particular examples, the controller can generate the valve pattern based on both the current geographic location and an irrigation plan defining an exclusion zone(s), whereby any of the nozzles determined to be located above the exclusion zone are excluded from the group of nozzles used to discharge the input water from the sprinkler arm. Further, the controller may operate to generate and transmit a speed control signal to one or more of the drive motors (or by communicating with electronics that control the pivot, such as the pivot's own control panel or by communicating with a separate pivot automation system) to adjust the rotation speed of the sprinkler arm based on a density of open valves in the valve pattern to maintain a desired application depth of the input water discharged from the sprinkler arm.

BRIEF DESCRIPTION OF THE DRAWINGS

FIGS. 16A-16O provide sections of a table or spreadsheet diagram showing use of the method of FIG. 15 to generate valve open/close patterns for a number of exemplary cycles (e.g., five cycles are shown).

DETAILED DESCRIPTION

The following describes a center pivot irrigation system that includes a flow and placement controller (or water flow controller) that is specially adapted to effectively control an irrigator (or sprinkler arm assembly) to more efficiently make use of an input water supply. The flow rate or pressure of input water may vary over a growing season (or irrigation season), and the flow and placement controller is useful for providing uniform depth of watering even with the changing inputs. Further, the farmer is able to designate one or more exclusion or "no irrigation" zones and a desired depth of watering desired for their field or crops. The flow and placement controller selectively operates the nozzles or sprinkler heads (e.g., via solenoid or other control valves provided for each nozzle or each set of nozzles (as two or more may be controlled by each solenoid/control valve)) and/or by adjusting the speed of the sprinkler arm (or rate of rotation). The following description provides examples of irrigation control for a center pivot irrigator, but it should be understood that the control concepts also may be used with a lateral irrigator in which there is no fixed center point but the entire irrigator can move with one end of the lateral pivot being the main control point (and some lateral irrigators can also rotate).

The use of the precision irrigation provided by the control methods described herein include: improved crop quality and yield; optimize water resources; increase water use efficiency; minimize input costs of water, fertigation, chemigation, and effluent; reduce energy costs for fuel and electricity; reduce trips to the irrigated field; ensure even application to reduce run-off and leaching; and allow water to be applied only to the most productive areas within a field. Added control is provided because pivot irrigators and/or pumps may be controlled when they are determined to be stopped or encounter errors (e.g., based on monitored changes in the flow rate or pressure of the input water). The farmer or pivot irrigator user is able to create variable rate irrigation plans that may include exclusion zones (or no irrigation zones/areas) for targeted application of the water supply (which may include fertilizer, chemical, effluent, and the like and still be considered "input water" for the sprinkler arm). The control method applies the right amount of water in the right place in the field (in irrigation zones identified in the irrigation plan) by comparing a present arm location in the field with the irrigation plan and then selectively controlling each nozzle or sprinkler head (via a control valve) along with the speed of the pivot arm.

Figure 1:
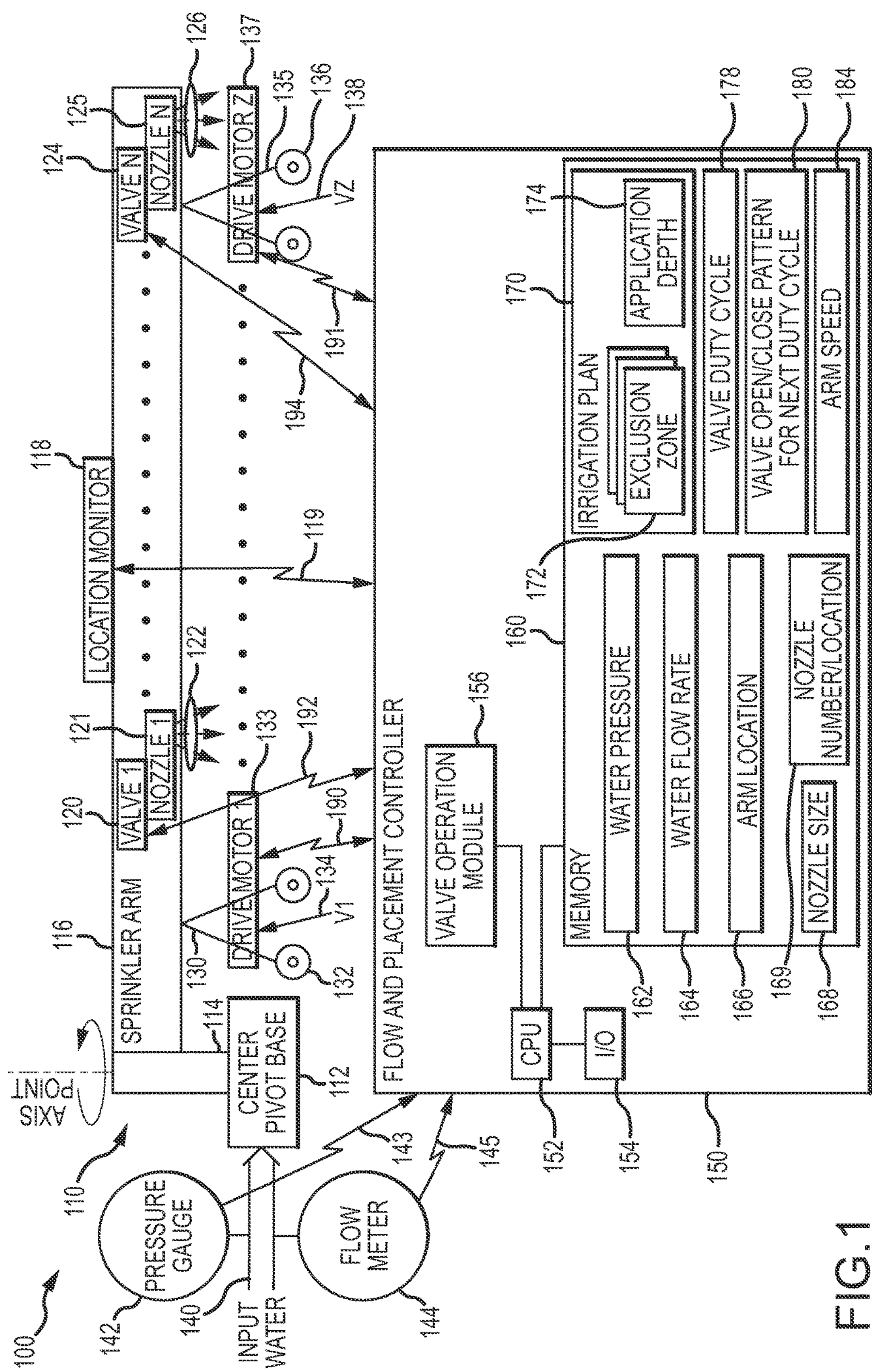
FIG. 1 is a functional block diagram or schematic of a center pivot irrigation system of the present description, with the system memory storing (e.g., with elements 168 and 169) data on a collection of valves/nozzles each with a design flow rate, ordinal location, and distance from center (to triangulate actual position)

FIG. 1 illustrates a center pivot irrigation system 100 that is configured to implement the flow and placement control method or techniques described herein. As shown, the irrigation system 100 includes a pivot irrigator (or sprinkler arm assembly) 110 that includes a center pivot base 112 upon which a pivot hub 114 is pivotally mounted. A sprinkler arm 116, which typically would include a number of interconnected pipe segments, extends outward a distance such as 300 to 500 meters or the like. The sprinkler arm 116 is supported by a number of towers 130, 135 that include a set of wheels 132, 136 and are driven at a rotation or arm speed as shown with arrows 134, 138 (and as V1 and VZ) by separately operable electric drive motors 133, 137. Typically, the outer most drive motor 137 is used to pace rotation of the arm 116 about the pivot axis, AxisPivot, with the inner drive motors 133 operating to maintain alignment of the various pipe segments of the arm 116. During irrigation operations, input water 140 is pumped or otherwise provided to the sprinkler arm 116 via the base 112 and hub 114 such as at a flow rate ranging from 400 gallons per minute (GPM) or less up to 2000 GPM or more. The input water flow rate typically is relatively constant for periods of time during a growing season but will typically vary at least periodically, e.g., vary from about 600 GPM at the beginning of a growing/irrigation season and then drop to 400 GPM toward the end of the growing season as the amount of water available for irrigation decreases. As noted above, the system 100 may include a non-rotating or rotating lateral irrigator in place of the center pivot irrigator 110 shown in FIG. 1.

The pivot irrigator 110 includes a plurality of nozzles 121, 125 spaced apart along the length or span of the sprinkler arm 116 for use in selectively discharging the input water 140 from the arm 116 to irrigate a field/crop as shown with arrows 122, 126. Significantly, the irrigator 110 also includes a control valve 120, 124 upstream of each nozzle 121, 125 to allow individual control/operation of each nozzle 121, 125, which allows selective application of the input water 140 to irrigation zones/areas of a field and no (or little) application to areas of the field in exclusion zones.

The inventor further determined that it would be desirable to provide uniform application of the input water in the irrigation zone/area while still utilizing a "constant" flow rate of the input water (i.e., without having to use a variable speed input pump). This is achieved in part by selecting nozzles 121, 125 that have relatively large capacities or flow ratings for their design pressure (which is typically controlled by a pressure regulator (not shown) at each nozzle 121, 125). The amount of "over sizing" of the nozzles 121, 125 may vary with one example being a capacity that would be needed to discharge an anticipated flow rate for the input water 140 if two thirds of the valves 120, 124 were closed (e.g., instead of using 3 GPM rated nozzles 121, 125, the nozzles 121, 125 may be chosen to be 9 GPM nozzles when water pressure is within a predefined pressure range). This allows the valves 120, 124 to be operated in an open/close pattern that causes a large number of the nozzles to be closed (e.g., up to two thirds in this non-limiting example) and still allow the input water 140 flow to be discharged as shown at 122, 126. The size/capacity of the nozzles, although oversized, still typically increase in capacity from the inner locations of the arm toward the outer locations of the arm.

The irrigation system 100 further includes a flow and placement controller 150 to monitor and control operations of the pivot irrigator 110 and its nozzles 121, 125 via the control valves 120, 124 and the drive motors 133, 137. The controller 150, which may take the form of a desktop, laptop, tablet, irrigation system controllers (e.g., irrigation controller electronics presently commercially available or designed in the future modified to provide the functionality described herein), or other computing device, includes one or more processors 152 that manage and/or operate input and output devices 154, which may be used to allow an operator to input and view data (such as via a keyboard, touchscreen, mouse, monitor, and the like). The I/O devices 154 also are used to provide wired or, more typically, wireless communications with the pivot irrigator 110 and its components.

Particularly, as shown in FIG. 1, the controller 150 operates to receive data from a pressure gauge 142 and from a flow meter 144 via wired/wireless signals 143, 145, and the controller manages memory/data storage devices 160 to store the measured water pressure 162 and water flow rate 164 of the input water 140. Further, the pivot irrigator 110 includes a location monitor 118, such as a Global Navigation Satellite System (GNSS) receiver or the like, that operates to gather location data (e.g., latitude and longitude information) for the sprinkler arm 116 that is transmitted in communications/signals 119 to the controller 150. The processor 152 acts to at least temporarily store this arm location data 166 in the memory 160. Further, the I/O devices 154 are operated by the processor 152 to transmit control signals to the drive motors 133, 137 as shown at 190, 191 and to the individual control valves 120, 124 for the nozzles 121, 125 as shown at 192, 194. In some cases (e.g., in a system 100 with a smart pivot 110), the controller 150 may ask the pivot's own controller (not shown in FIG. 1) to make a certain velocity while in other cases, as shown, the controller signals 190, 191 the motors 133, 137 only (and the motors 133, 137 drive themselves as discussed above).

The controller 150 also operates to execute or run software code/programs to provide a valve operation module 156 that operates, as discussed further herein, to process the irrigator monitoring data 162, 164, 166 and, in response, to generate the control signals 190, 191 to control the speed 134, 138 of the arm 116 and to control which valves 120, 124 are open and which valves 120, 124 are closed during each operating period. The operating period may be labeled a "valve duty cycle" and stored as shown at 178 in the memory 160. The valve duty cycle 178 may be varied to implement the irrigation system 100 with a time period in the range of 20 to 120 seconds typically being useful and with a 30 second time period being used in some of the examples provided herein. Prior to each valve duty cycle (e.g., prior to the next 30 second time period), the valve operation module 156 acts to determine a valve open/close pattern 180, which defines which of the nozzles 121, 126 will be used to discharge 122, 126 the input water 140 (i.e., which valves 120, 124 will be controlled via signals 192, 194 to be open along the span of the arm 116).

To this end, the valve operation module 156 may process a variety of information to ensure ongoing use of the whole amount of the input water 140. The input data to the module 156 may include nozzle sizes or output capacity ratings 168 as well as the nozzle number and location 169 along the arm 116 as shown as stored in memory 160. For example, a sprinkler arm 116 may include a relatively large number of nozzles 121, such as 30 to 250 or more, that are spaced apart some predefined/known distance, such as 5 to 20 meters or the like (e.g., the actual distance from the axis point (or element 114) may be recorded to each individual valve 120, 124/nozzle 121, 125 and then triangulate each valve's position individually). The valve operation module 156 can use the nozzle sizes/capacities 168 and number information 169 along with the water pressure 162 and/or flow rate 164 of the input water 140 to determine what fraction/percentage of the nozzles 121, 125 need to operate to output the input water. The final actual resulting valves open (valve pattern 180) are done based on their flow rates in many implementations (and not on a percentage of the volume of the nozzles), and the percentage value may be used as a leading indicator with this ratio being used by the module 156 (in some cases) to help evenly space apart the valves that are open during a valve duty or irrigating cycle.

Further, though, the valve open/close pattern 180 may depend on user/farmer input information that may be provided as an irrigation plan 170 stored in memory 160 or otherwise accessible to the valve operation module 156. In the irrigation plan 170, a user/farmer may define one or more exclusion zones (or no irrigation areas) 172 in the field in which the pivot irrigator 110 is positioned and operated. For example, the field may have obstacles or features where no crops are planted such as a road or river, and these areas may be defined by a boundary (e.g., a plurality of geographic coordinates) in the field or circular area covered by the sprinkler arm 116 during its rotation. As another example, the farmer may have determined that due to soil properties or other factors that one or more areas or zones in the field are not productive enough to justify irrigation, and these areas may be included in the exclusion zones 172 (defined by a geographic coordinate-based boundary).

The exclusion zones 172 are used in conjunction with the arm location 166 and nozzle location information 169 to determine which valves should be closed (or which should be opened) in the pattern 180 for the next duty cycle (i.e., close valves 120, 124 associated with nozzles 121, 125 over or spraying onto an exclusion zone). Once the pattern 180 is defined for a next duty cycle, the controller 150 may operate at the start of the duty cycle to generate and transmit the control signals 192, 194 to the control valves 120, 124 (or only to those that have their operational status changed from the prior duty cycle in some implementations).

Further, the irrigation plan 170 may allow the user/farmer to define application depths 174 for irrigation zones (i.e., areas of the irrigated circular area not in an exclusion zone 172). These may vary to suit a particular crop and may be changed over a growing season (e.g., more water may be desired at particular times during a growing cycle for a crop and may vary between crops) and/or due to weather conditions (e.g., less application if rainfall has occurred and the like). The valve operation module 156 may use the application depth 174 to set the valve open/close pattern 180 in an irrigation zone and/or to set the arm speed 184, e.g., decrease the speed 134, 138 of the arm 116 when a greater application set is defined for the irrigation zone and vice versa. Again, when the center pivot includes its own controller (e.g., is a smart pivot), the controller may communicate with the pivot's own controller to make a certain velocity.

The arm speed 184 may also be set by the valve operation module 156 based on a particular valve open/close pattern 180. For example, a pattern 180 may be very dense (i.e., include many open valves 120, 124 in a relatively short span of the arm 116), and the arm rotation speed may be increased when such a pattern 180 is utilized so as to retain a desired uniform application depth in the irrigation zones under this dense pattern of opened valves. The arm rotation speed may be decreased when the pattern 180 is less dense so as to retain a desired uniform application depth in the irrigation zones under this less dense pattern of opened valves. The arm speed 184 is used by the controller 150 to generate and transmit control signals 190, 191 to the drive motors 133, 137 on the arm support towers 130, 135 to control or set the rotation speed of the arm 116 during the next or upcoming duty or operation cycle (e.g., for the next 30 seconds or other predefined operating cycle for the irrigation system 100).

Figure 2:
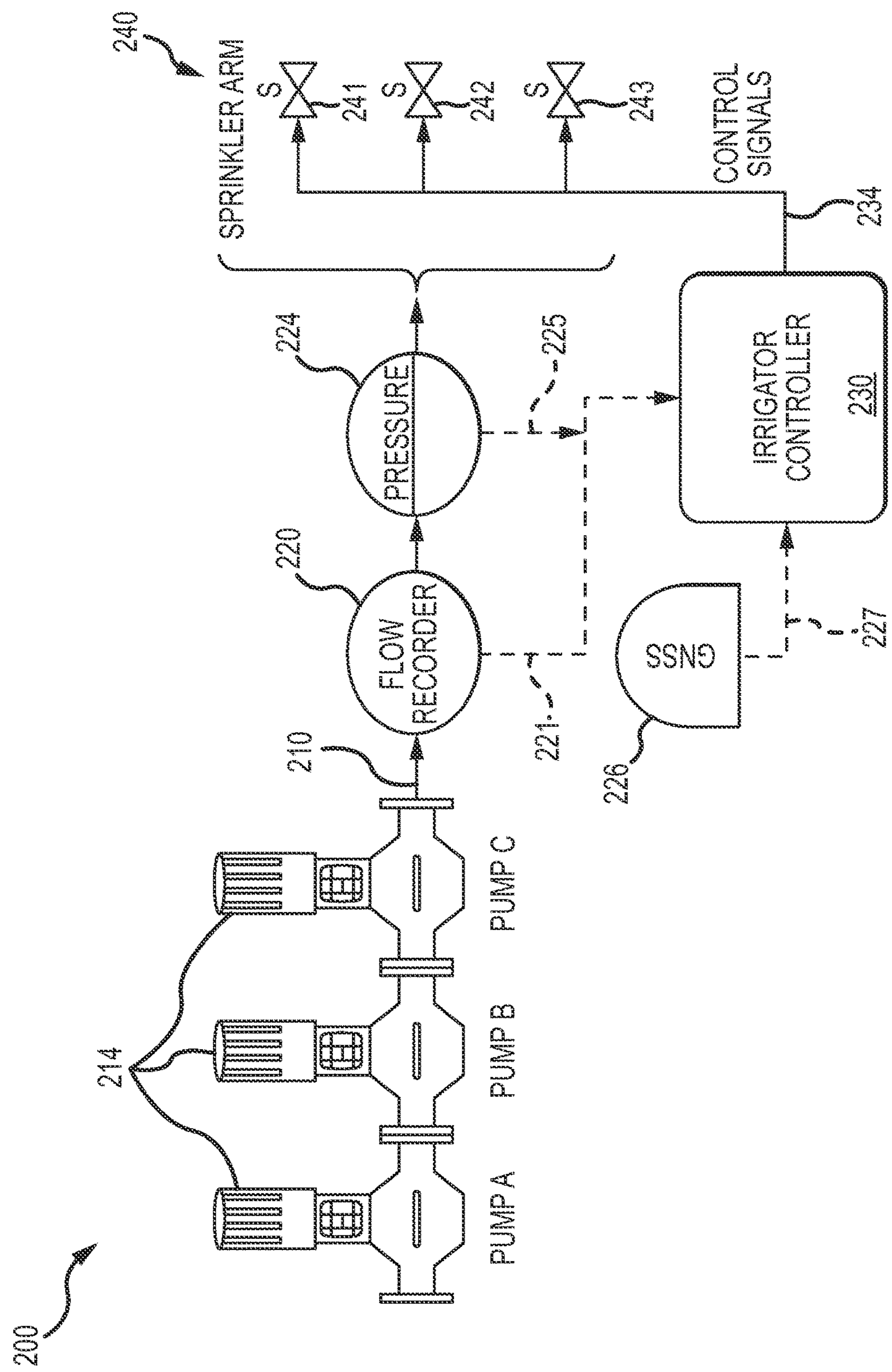
FIG. 2 is a functional block diagram or schematic of a portion of a center pivot irrigation system of the present description.

FIG. 2 provides a schematic or functional block diagram of a portion of center pivot irrigation system 200 in a manner that facilitates explanation of operation of the irrigator controller 230 (which may be used for the controller 150 of FIG. 1). As shown, input water 210 that will be used for irrigation during rotation of a sprinkler arm 240 is provided by multiple pumps 214. In practice, the pumps 214 typically will each have a fixed flow rate. The system 200 includes a flow sensor/recorder 220 along with a pressure sensor/gauge 224 on or in the inlet line to the sprinkler arm 240, and the water flow value 221 and pressure value 225 are inputs to the irrigator controller 230. The irrigator controller 230 operates to determine the actual water volume to be output via nozzles (not shown but one nozzle (or more) may be downstream of each solenoid valve 241, 242, 243) of the sprinkler arm 240.

A GNSS receiver (or other position-determination device) 226 provides the current position 227 (e.g., a GNSS position) of the irrigator or sprinkler arm 240. The current arm position 227 of the arm 240 is compared with an irrigation plan to define desired areas of land to be irrigated, e.g., exclusion and irrigation zones present under the arm 240 and, more specifically, under the nozzles in the arm 240 that are individually controlled via signals 234 to solenoid valves 241, 242, 243. In this example, each nozzle on the irrigator or sprinkler arm 240 is controlled by a solenoid valve 241, 242, 243. Each of the nozzles has an expected water flow volume, and the irrigator controller 230 operates to generate the control signals 234 to drive an expected water flow output by opening nozzles to match the required volume.

Figure 3:
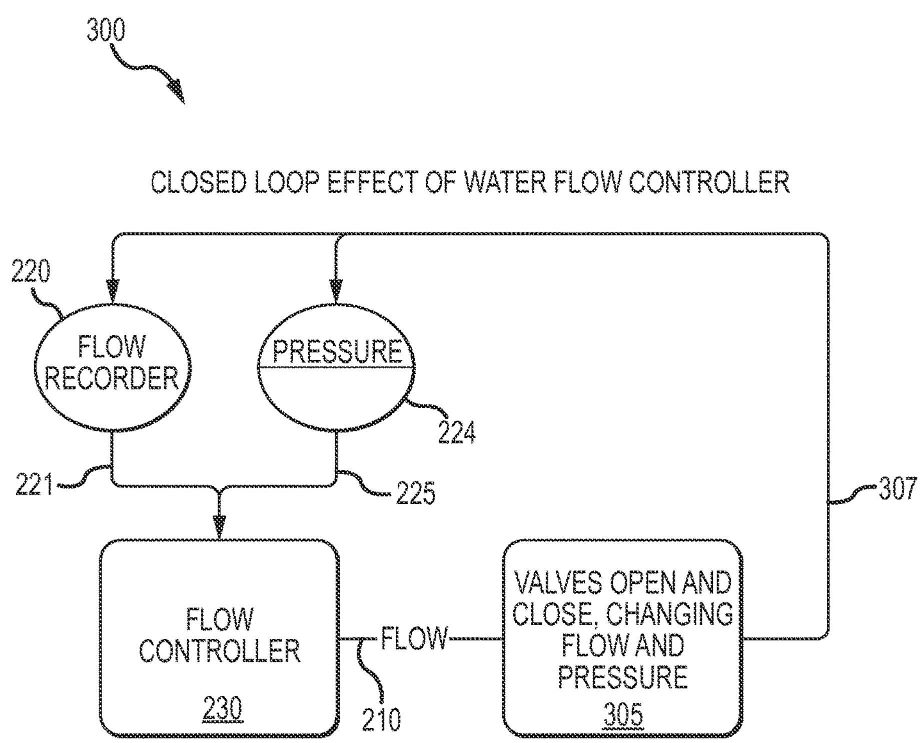
FIG. 3 illustrates schematically a portion of the system of FIG. 2 showing the closed loop effect of the water flow controller of the system.

FIG. 3 illustrates a closed loop 300 provided during the operation of the system 200 of FIG. 2 by the controller 230. Particularly, the controller 230 processes the flow rate data 221 from flow recorder 220 and pressure data 225 from the pressure gauge 224 to determine the flow 210 that needs to be discharged by the irrigator. The controller 230 generates signals to cause, as shown in box 305, the valves to open and close. This can produce a change in flow and pressure as shown by arrow 307. Hence, the controller 230 may be thought of as a closed loop-type controller where changes to the solenoid actuation (e.g., how many and which solenoids 241, 242, 243 are operated to discharge water through downstream nozzles) impacts the ability for water to pass through the pivot irrigator, which impacts water flow and pressure of the irrigation system. In reality or practice, the controller 230 is configured to drive a constant pressure solution, which provides a relatively constant flow solution.

Figure 4:
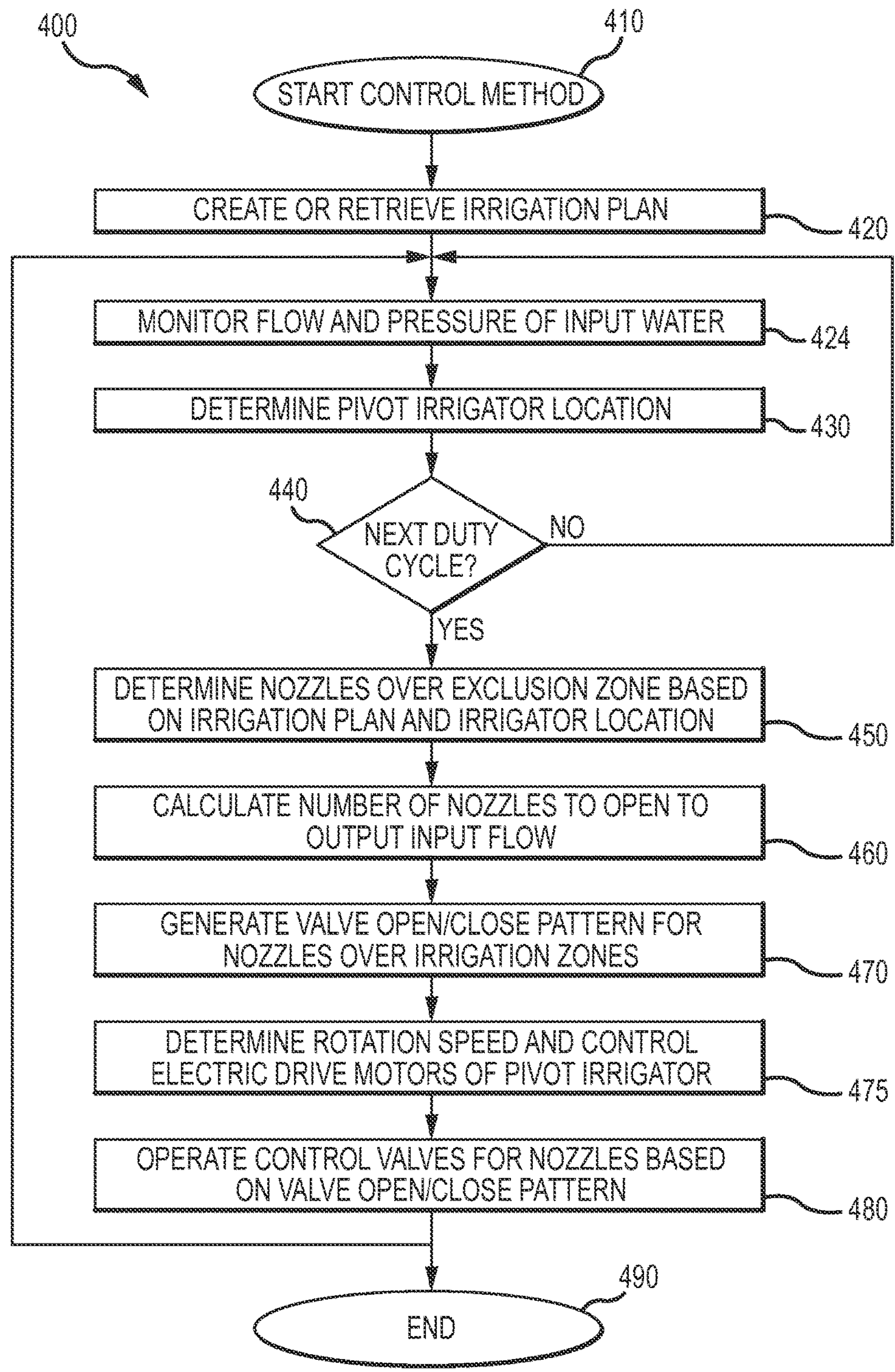
FIG. 4 is a flow diagram of an exemplary flow and placement control method that may be implemented, e.g., by a controller of the systems of FIGS. 1 and 2, to provide more efficient use of water input to an irrigation system.

FIG. 4 illustrates a flow diagram of a flow and placement control method 400 that may be implemented by a flow and placement controller (e.g., the controllers of the systems 100 and 200 of FIGS. 1 and 2) during irrigation operations provided by a center pivot irrigation system. The method 400 starts at 410 such as by loading a valve operation module or similar software upon a controller of an irrigation system. Step 410 may also include adapting a pivot irrigator (or sprinkler arm) with a flow meter/recorder, a pressure gauge, and a GNSS receiver (or other location device), and communicatively linking these components with the controller. Further, step 410 may involve communicatively linking drivers/controllers of electric drive motors for the pivot irrigator with the flow and placement controller to allow the controller to set the rotation speed for the pivot irrigator (e.g., based on densities of open valves used for irrigating a portion of the field). Still further, step 410 may involve reconfiguring a pivot irrigator to have over-sized nozzles for an anticipated input flow rate (e.g., so all nozzles do not have to be operated to output the flow and, instead, can be selectively and individually opened/closed (control valves pulsed)) and/or providing control valves (e.g., solenoid valves) that are remotely controllable by the flow and placement controller upstream of each of the nozzles (or pairs or sets of nozzles of a sprinkler head in some cases).

The method 400 continues at 420 with the creation of or retrieval of an irrigation plan for the field in which the pivot irrigator is positioned. The irrigation plan may define an application rate for irrigation zones (i.e., areas of the field that will be irrigated and not in an exclusion zone). Further, the irrigation plan may define one or more exclusion zones where it is desired to apply no (or little) water with the pivot irrigator. For example, a user/farmer may interact with a user interface to the controller to define geographic boundaries of areas or zones in the field that contain obstacles or that have been determined to have lower productivity (or that they otherwise do not want to irrigate). Too much or too little water can affect the quality and yield of a crop. By creating an irrigation plan that optimizes water usage, the user/farmer can maximize their crop's potential to achieve greater profitability. Step 420 may include the user/farmer drawing polygons (via a user interface to controller) on top of a satellite map or soil map of the field to be irrigated to define boundaries of exclusion zones (or of irrigation zones). The irrigation plan may define different application rates for the field for each rotation or for differing times during the growing season. The irrigation plan allows the user to manage exclusion zones to ensure water is not being wasted in areas that do not need it such as roadways or other fixed landmarks. In step 420, the irrigation plan may be sent wirelessly to the controller of the pivot irrigator. Step 420 may include two parts: (a) sending the exclusion zones to the pivot while saving the zones in memory and (b) to start an irrigation process, the desired application depth and starting flow rate are sent to the pivot. In part (b), if the pivot is not already watering, the pivot is instructed to start moving and enable pumps.

The method 400 continues at 424 with monitoring flow and pressure of water being input into the pivot irrigator. Step 430 involves determining the current pivot irrigator location within the field (or within the circularly-shaped area over which the irrigator is rotated) such as via information gathered by a GNSS receiver that is transmitted to the flow and placement controller. The method 400 continues at 440 with determining whether the present duty cycle or valve cycling time period has expired (e.g., has 30 seconds passed (or nearly passed) in some of the examples provided herein), and, if not, the monitoring step 424 and pivot location determination step 430 may be repeated.

If yes at 440, the method 400 continues at 450 with determining which nozzles should be closed because they are currently located over an exclusion zone defined in the irrigation plan. Step 450 may be completed by comparing the current location of the pivot irrigator with one or more exclusion zones' boundaries in the irrigation plan and by determining which lengths or portions of the pivot irrigator (or sprinkler arm) is presently located over the exclusion zone. Then, each nozzle in these lengths or portions of the pivot irrigator can be set "off" during the next duty cycle, and the valve open/close pattern may indicate all these nozzles not to be used. In step 480, control signals can be sent to the solenoid valves associated with these nozzles to close (or keep closed) each of these valves.

The method 400 continues at 460 with a determination of how many of the nozzles in the pivot irrigator should be opened in the next duty cycle to discharge the desired volume of input water (e.g., to retain a relatively uniform flow rate through the pivot irrigator). This determination is made based on the set of nozzles that are not in the exclusion zones, the capacities of these nozzles, and the location of the nozzles (in some cases). Step 460 may include calculating the quantity and the combined flow rate of the valves that are being allowed to irrigate, and, then, calculating the ratio of the input water flow to the combined valve flow rate.

Then, with this number of nozzles known and the combined flow rate thereof, the method 400 continues at 470 with generating the valve open/close pattern for nozzles over the irrigation zone. Initially, the calculated number of nozzles may be randomly or otherwise (e.g., generate a distribution of open valves or operated nozzles may that more evenly staggers the operated nozzles) spread over spans or sections of the pivot irrigator over the irrigation zones. The valves can be selected by starting with the largest valve and working back to the smallest valve (or associated nozzle capacity). The gap between valves is based on the ratio of the total combined flow of the valves that are allowed to be on, based on the irrigation plan (e.g., see step 420), to the input flow rate. For example, if the input flow rate is 500 GPM and the combined flow rate of the nozzles allowed to be on is 1500 GPM, then every third nozzle starting from the largest nozzle will be on. As the ratio is often not a round integer, the spacing is rounded down to the nearest integer for the first pass. The process starts again from the second largest nozzle until the total flow rate of selected nozzles would exceed the input flow rate.

During following cycles, though, it is desirable to obtain a more uniform distribution of output water through each nozzle over an irrigation zone to provide uniform application depths of the water. With this goal in mind, the step 470 may include determining whether a nozzle has been used at least once over a predefined number of duty cycles. For example, the step 470 may require that each nozzle is used at least once every three (or some other number of) duty cycles. In this way, nozzles that were not used for the prior two (or some other number of) duty cycles may be used (their solenoid valves opened) in the next duty cycle. In this way, the valve open/close pattern may be the same or, more often, will differ each duty cycle such that the control method may be thought of as selectively and individually pulsing the solenoid valves that direct flow through the nozzles on the pivot irrigator.

In some implementations, the control method (and controller implementing this method) may maintain a counter for every valve (or every nozzle(s) associated with each valve) and may keep a record of the number of times that the valve would be open. Following the initial valve selection process, subsequent selections give priority to valves based on the number of times they have been allowed to open. The valves with the lowest number of open cycles will be selected first. In practice, this means that any valve could never, or almost never, be more than one cycle behind. Significantly, the control module's logic is designed such that the valves that are over exclusion zones are still included in the selection logic/process by incrementing their counters as if they were irrigating (even though closed or off), but their available volume or flow is not added to the total combined flow rate.

The method 400 then continues at 475 with determining the rotation speed for the pivot irrigator for the next duty cycle. The nozzles have been oversized for the flow but are pulsed on and off so it may be useful to run the pivot irrigator at slower speeds than maximum settings to get an equal amount of water applied on the field (e.g., 1 to 2 meters/minute or the like as a maximum and then choose settings or offset from these maximums). Typically, the more dense the pattern of valves (or the more nozzles that are being used) the more quickly the pivot irrigator will be rotated to provide more uniform application of water on the field (in the irrigation zone). Then, in step 475, control signals are generated and transmitted to the drives of the electric motors on the wheeled towers of the pivot irrigator to cause these drive motors to rotate the pivot irrigator at the desired rotation speed.

The method 400 continues at 480 with the controller sending control signals to the solenoid valves to open flow to a select set of nozzles as defined by the valve open/close pattern generated in step 470. Step 480 may be a controlled, timed process. Each valve can be instructed in turn in an ordinal process from the center of the pivot outward. The valve is instructed to turn on (or off), and there is a programmed delay (e.g., of 50 to 100 milliseconds with 70 milliseconds used in some cases) between the instruction to each valve to ensure a smooth transition of pressure down the pivot pipe/arm as the valve states change. The method 400 may end at 490 or may continue at steps 424, 430, and 440 (repeat calculations for next valve duty cycle or next irrigation system operating period).

Figure 5:
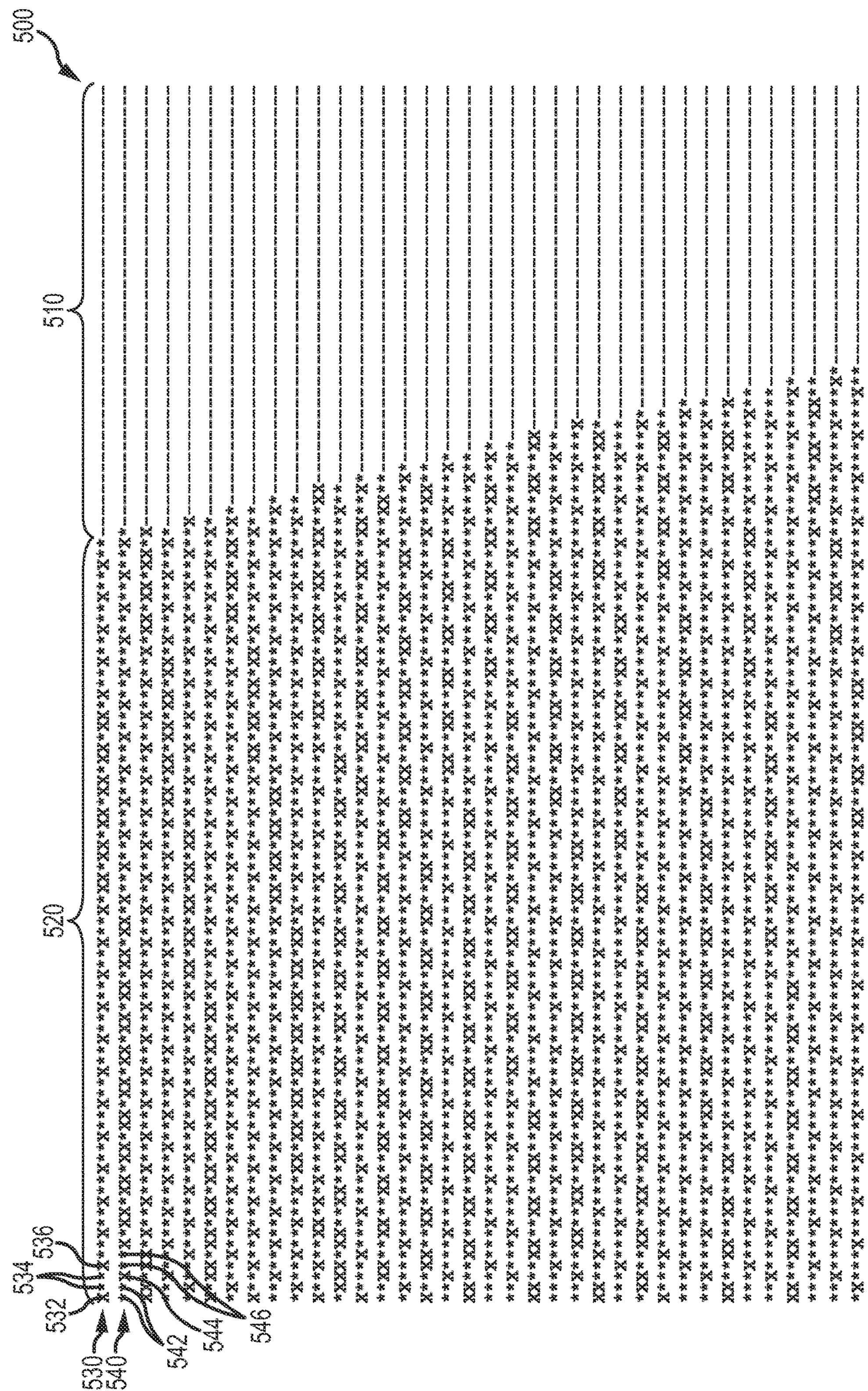
FIG. 5 is a chart or diagram showing valve open/closed patterns for a number of valve duty cycles (or irrigation system operating periods) for an exemplary field and irrigation plan for that field.

FIG. 5 is a chart or diagram 500 showing valve open/close patterns for a number of valve duty cycles (or irrigation system operating periods) for an exemplary field and irrigation plan for that field. Particularly, the rows represent the valve open/close pattern for each successive duty or operating cycle, with each column showing a solenoid valve (which is used to open and close to provide and block flow to at least one nozzle) and with "X" being an open solenoid valve (or water "On" through the nozzle), with "*" representing a closed valve (or valve and water "Off"), and "–" also being a closed valve (or valve/nozzle pair over an exclusion area where it is undesirable to spray water). In this example, an irrigation plan is being implemented by a flow and placement controller that includes an exclusion zone 510 and an irrigation zone 520 (i.e., areas not part of the exclusion zone).

Row 530 provides a first valve open/close pattern with all the valves closed over the exclusion zone 510. In the irrigation zone 520, an outer most valve 532 (which is shown innermost on the chart/graph 500) is open but the next two valves 534 are closed and the fourth outer most valve 536 is again open. This will cause water to flow out of the nozzles associated with valves 532 and 536 and not those associated with valves 534. The pattern provided in row 530 is carried out for one valve duty cycle (or irrigation system operating period). Then, in a next duty cycle, a new valve open/close pattern as shown in row 540 is implemented. In the pattern of row 540, it can be seen that the size of the exclusion zone 510 has changed (e.g., shrunk by the length of the pivot irrigator that includes or is covered by one valve (and one or more associated nozzles)). Hence, the irrigation zone has increased in size (length) and more nozzles can be used to provide the output flow during this next duty cycle. The valve open/close pattern of row 540 differs from that of row 530 with the two outer most valves 542 now being closed, the third outer most valve now being opened, and the fourth outer most valve being closed. By inspecting these two rows 530, 540 and the other rows in the diagram 500, it can be seen that the exclusion zone 510 and irrigation zone 520 can change over time as the pivot irrigator is rotated in a field and to suit a user-defined irrigation plan. Also, it can be seen that the valves are pulsed on and off as the valve open/close pattern changes in each valve duty cycle.

This changing pattern of opened and closed valves changes which nozzles are used to discharge water, which can be used to provide a nearly constant flow rate through a pivot irrigator and also provide relatively uniform application depths being provided across the irrigation zone 520. The valve open/close patterns along with the changing exclusion zone 510 and irrigation zone 520 were used in a test of the control method. The goal flow rate through the pivot irrigator was 1200 liters per minute (LPM), and the results indicated that the actual flow rate or LPMs varied from 1156 LPM to 1233 LPM. While the flow was not exactly uniform, the flow through the pivot irrigator was maintained as a relatively even or "constant" output (e.g., the terms "uniform" and "constant" as used herein should be construed to allow some amount of variance from a target value such as a range of less than about 5 percent about the target value). Additionally, in this test, the speed of the pivot was decreased from about 22 percent of maximum to 16 percent of maximum as the size of the irrigation zone increased (the size of the exclusion zone decreased). This can be restated as the more widely spread the open valves are the slower the pivot irrigator should travel over the irrigated field.

Figure 6:
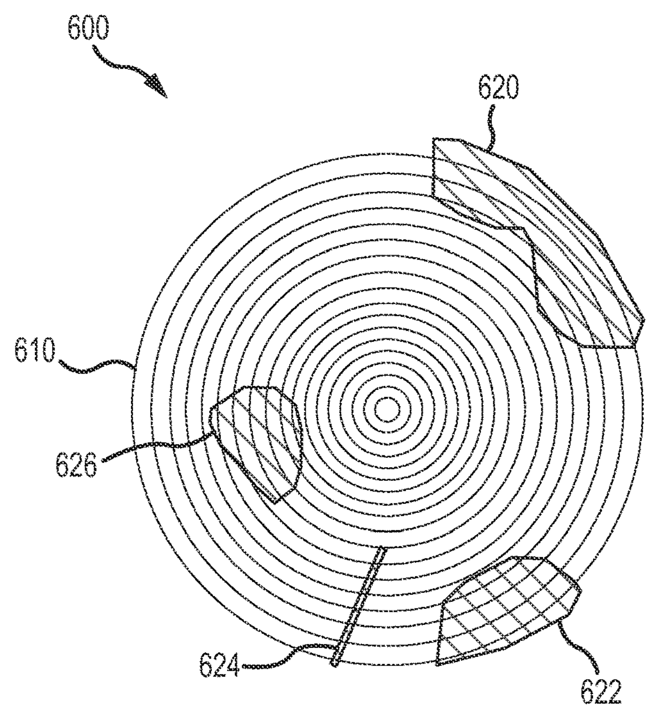
FIGS. 6-8 illustrate a geographical map (e.g., a soil map) for a field to be irrigated with a center pivot irrigation system of the present description, an irrigation plan for the field, and a graph showing monitoring of each control valve (and associated nozzles) for a sprinkler arm, respectively.
Figure 7:
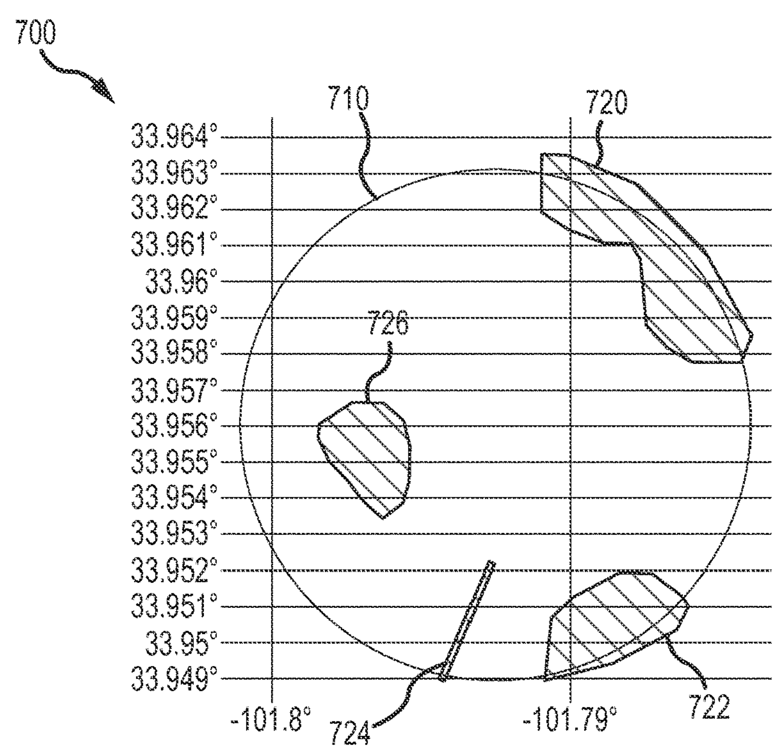
Figure 8:
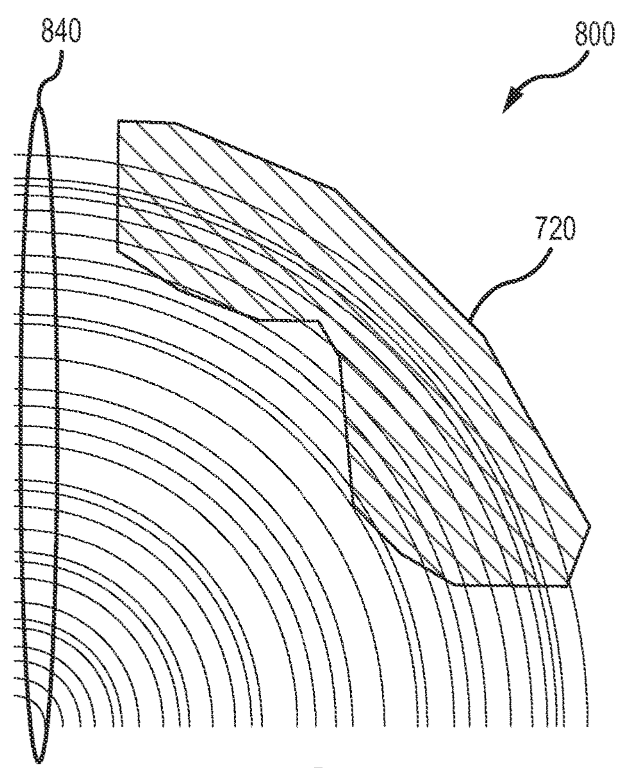

At this point in the description, it may be useful to provide several practical working examples or simulated uses of a center pivot irrigation system with the flow and placement control software used by the system's controller to control operations. FIGS. 6-8 illustrate a geographical map (e.g., a soil map) 600 for a field to be irrigated with a center pivot irrigation system of the present description, an irrigation plan 700 for the field, and a graph 800 showing results of monitoring each control valve (and associated nozzles) for a sprinkler arm, respectively, during irrigation operations. In map/plot 600, a user/farmer has provided input (e.g., the map 600 may be displayed in a controller user interface to the user/farmer) by drawing or generating a set of polygons 620, 622, 624, 626 defining areas of the field that should not be irrigated or "exclusion zones" within the circular area 610 covered by the center pivot irrigator or rotating sprinkler arm. Polygons 620, 622, 626 may provide boundaries for areas of the field that are not productive enough to warrant irrigation or contain natural features preventing planting such as a rock field, a pond, or the like. Polygon 624 may correspond to an obstacle such as a road that also should not be irrigated.

From this map/plot 600, the controller and its software can operate to generate the irrigation plan 700 shown in FIG. 7. In the irrigation plan 700, the geographic coordinates (latitude and longitude values) are provided for the field and, particularly, for the circular irrigated area 710 covered by the pivot irrigator. The geographic boundaries for the four user-defined exclusion zones 710, 722, 724, 726 are also illustrated in the irrigation plan 710. The areas outside these exclusion zones may be considered irrigation zones or areas, and the irrigation plan 700 may also define application depths (or irrigation goals) for the irrigation zones for the whole growing season or for subsets/periods of time within the growing season. The controller for the system can then use the irrigation plan 700 to control valves of the sprinkler arm to not discharge any (or little) water in the exclusion zones 720, 722, 724, 726 and provide uniform application of the "constant" water flow through the sprinkler arm.

Graph 800 shows a large set of lines 840 that can be used to monitor each individual control valve in the sprinkler system as it moves over the irrigated area including over exclusion zone 720. Monitoring of each valve allows the controller to determine that each valve is receiving a proportional amount of the water flowing through the sprinkler arm to better achieve uniform application depths in the field.

In this example, the irrigation system included a pivot irrigator with 247 valves, and each valve controlled flow to two nozzles (e.g., the pivot irrigator has 494 nozzles such as with a sprinkler head with two nozzles being downstream from a solenoid valve that was individually operable by the controller). The total available spray (or water flow) of the pivot irrigator was 5858 LPM (e.g., due to the number of the nozzles and their capacities at design pressures). However, this is an "oversizing" of the nozzles because the goal flow was to run the pivot irrigator at a constant flow rate of 2700 LPM, avoiding the prescribed no spray areas or exclusion zones of the irrigation plan. As shown in graph 800, the first 90 degrees of this exemplary field and irrigation plan 700 includes a kidney shaped exclusion zone 720.

In the following data and graphs, one hundred percent on the pivot speed offset occurs when the actual nozzles under coverage equals 2700 LPM without any flow control management. As the flow is distributed over a larger area, the pivot irrigator is controlled so as to slow down by the inverse proportion. The controller may use a multiplier, e.g., if 1-inch of depth is achieved with this nozzle package at 50 percent speed then a factor of 60 percent can be used by the controller to make the pivot move or rotate at 30 percent of full pivot speed.

Figure 10:
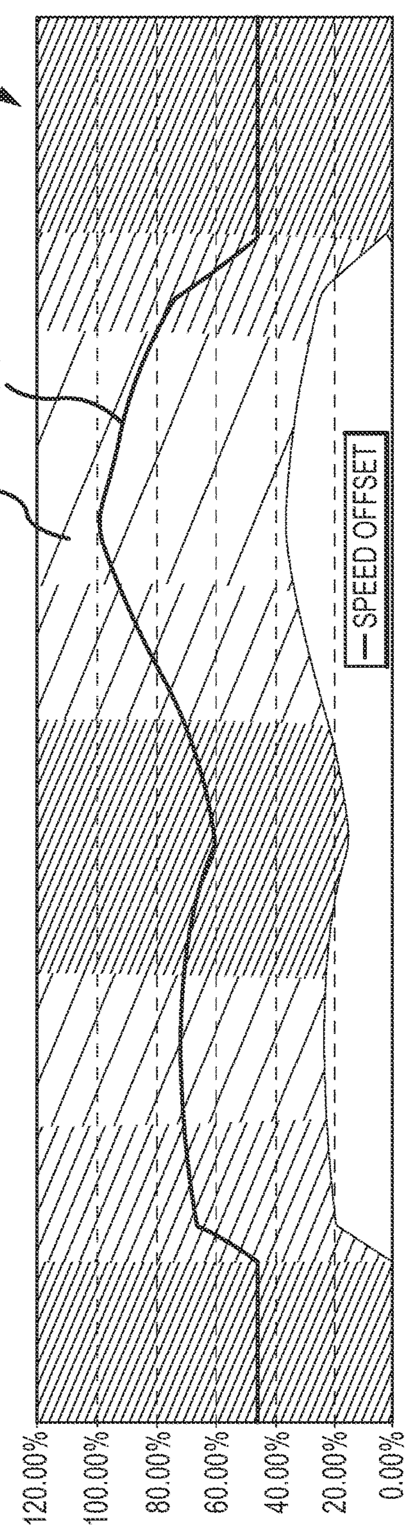

Graph 900 illustrates modeled results of the irrigation system, with LPM shown on the Y-axis, as it is rotated at varying speeds and its valves are selectively operated through the first 90 degrees of the circularly shaped irrigated area. The graph 900 is generated from modeling what would happen to an irrigator with a particular irrigation plan, and the before LPM value 920 is the sum of the flow rate of all the valves that are over an irrigated area. In practical terms, it would not be possible to run that much water through the pivot. Graph 1000 illustrates similar modeled results but with offset speed values provided on the Y-axis. The line 920 shows the flow rate (in LPMs) due to no spray areas or exclusion zones when no flow control is applied. In contrast, though, the line 930 shows irrigation of these same areas of the field with flow control (as taught herein) being applied to provide a smoothed flow rate of about 2700 LPM. In FIG. 10, line 1020 represents a ratio of pivot speed that is selected and implemented by the controller and its software to suit the changing nozzle output, e.g., the pivot irrigator is caused to travel faster or at greater rotation speeds when the sprinkler arm is traveling over an exclusion zone (or as the open valve density increases).

Figure 9:
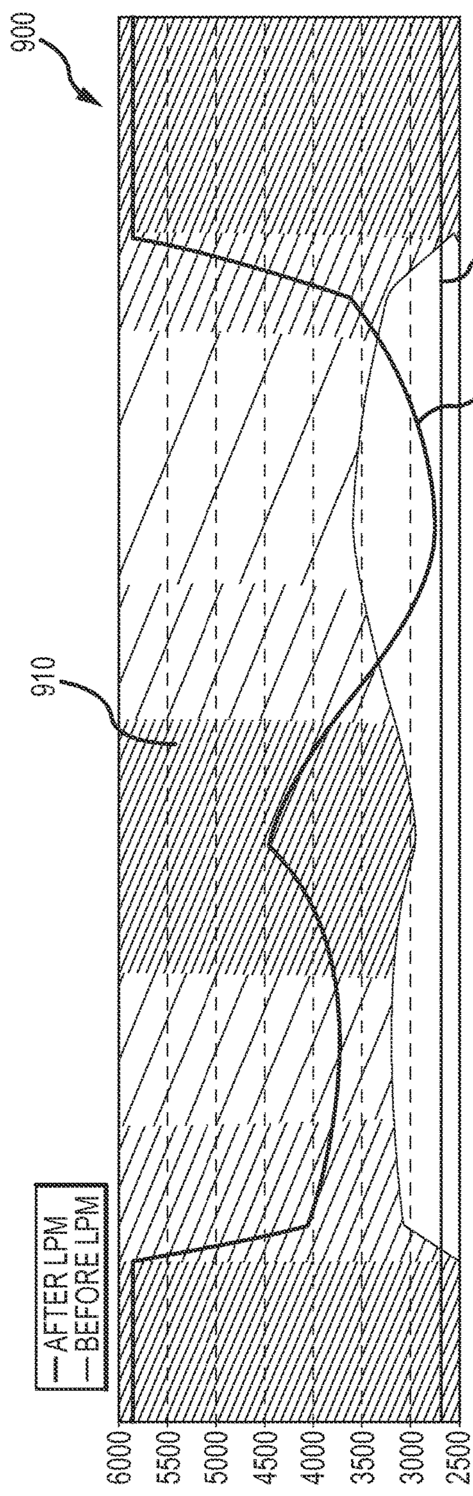
FIGS. 9 and 10 illustrate operational results when the flow and placement control method is applied to a pivot irrigator used in the field represented by the maps and irrigation plan of FIGS. 6-8.

In FIGS. 9 and 10, the backgrounds 910, 1010 to these graphs 900, 1000 represent the density of nozzles that are open along the span or length of the sprinkler arm to achieve the constant flow rate shown with line 930. When the entire pivot length is covered, each nozzle is off approximately 54 percent of the time. As the no spray area covers more nozzles, the number of nozzles that are off for flow smoothing reduces, and this results in a denser nozzle spray pattern (as can be seen toward the center of graph 900 in FIG. 9). The density of spray pattern is directly proportional to the speed multiplier of the pivot irrigator as can be seen with line 1020 in graph 1000.

Some interesting wave patterns occur in the required flow distribution when the no spray area/exclusion zone reduces and then soon enlarges again. As the pivot irrigator moves over the portion of the field including exclusion zone 624, the amount of water being reduced by no spray increases as the pivot rotates and the nozzles over the no spray area or exclusion zone become progressively larger. Hence, the number of nozzles over irrigation zones and available for discharging the total flow rate (e.g., 2700 LPM) reduces and then quickly rises back up once the no spray area is passed by the sprinkler arm. However, due to the use of over sizing of the nozzles, the flow rate can be maintained at a range about 2700 LPM (e.g., vary about 2700 LPM by no more than 40 to 50 LPM (above and below 2700 LPM)).

Figure 11:
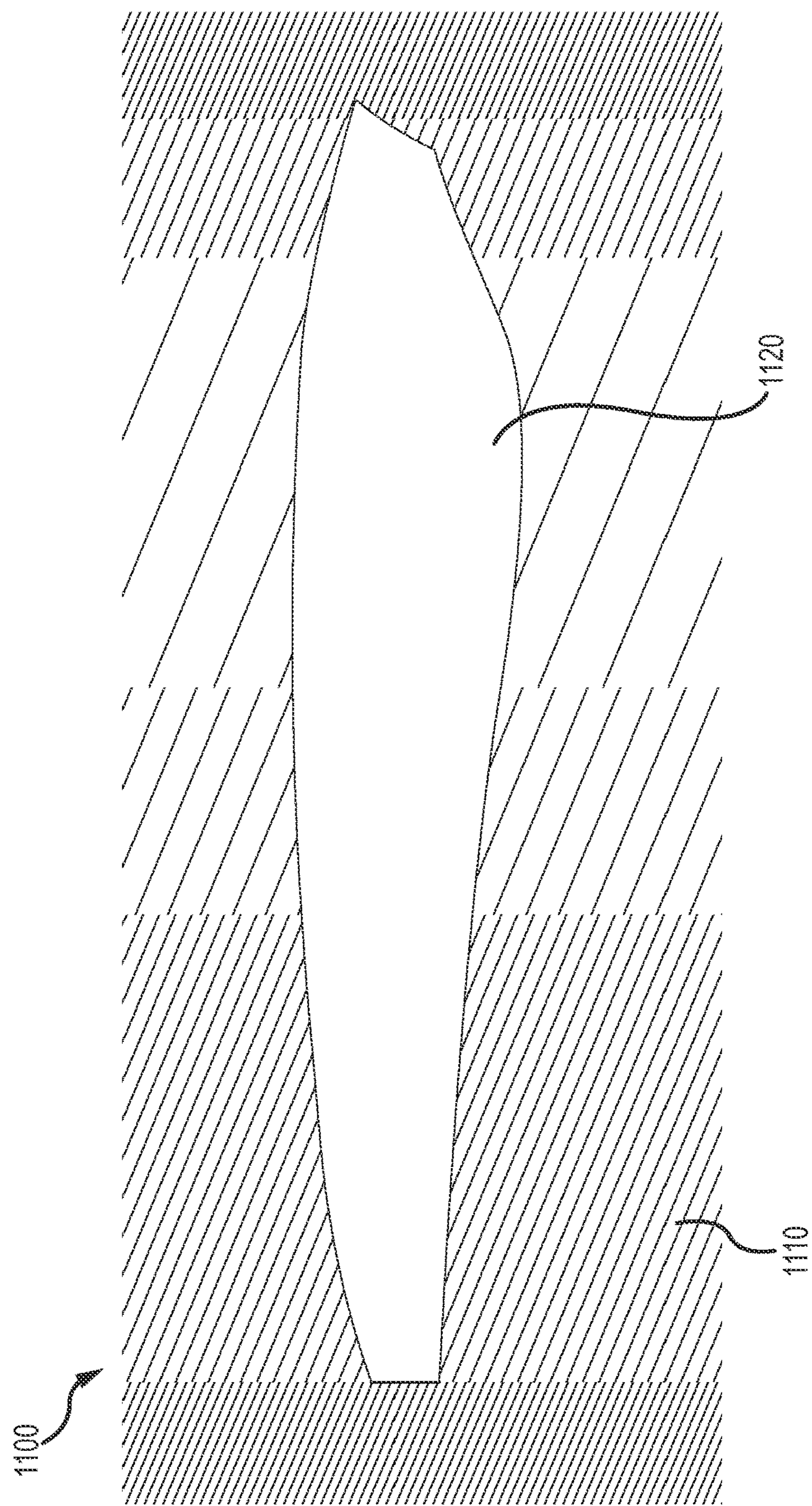
FIG. 11 illustrates a graph similar to the graph of FIG. 9 as the pivot irrigator is rotated over the fourth exclusion zone of the irrigation plan that defines a no spray area in the center of the pivot area.

FIG. 11 illustrates a graph 1100 similar to the graph 900 of FIG. 9 as the pivot irrigator is rotated over the fourth exclusion zone of the irrigation plan that defines a no spray area (e.g., see area 1120 in graph 1100) in the center of the pivot area. The background pattern 1110 represents the density or pattern of open nozzles (or open valves) along the length of the sprinkler arm, with the inner nozzles being at the top of the graph 1100. An irrigation plan with a no spray area or exclusion zone 1120 (or 726 in FIG. 7) creates some specific control challenges as the distribution of the required flow needs to remain even across both very large capacity nozzles and very small capacity nozzles but without a large set of medium capacity nozzles to help average out the flow requirement. The flow distribution image shown in graph 1100 shows how this can be achieved, with continuously recalculated distribution by the software of the controller as the area 1120 in the center changes shape and its volumetric effect. An even distribution can be maintained throughout the process, with output remaining within a range of about 2650 to 2750 LPM.

Figure 12:
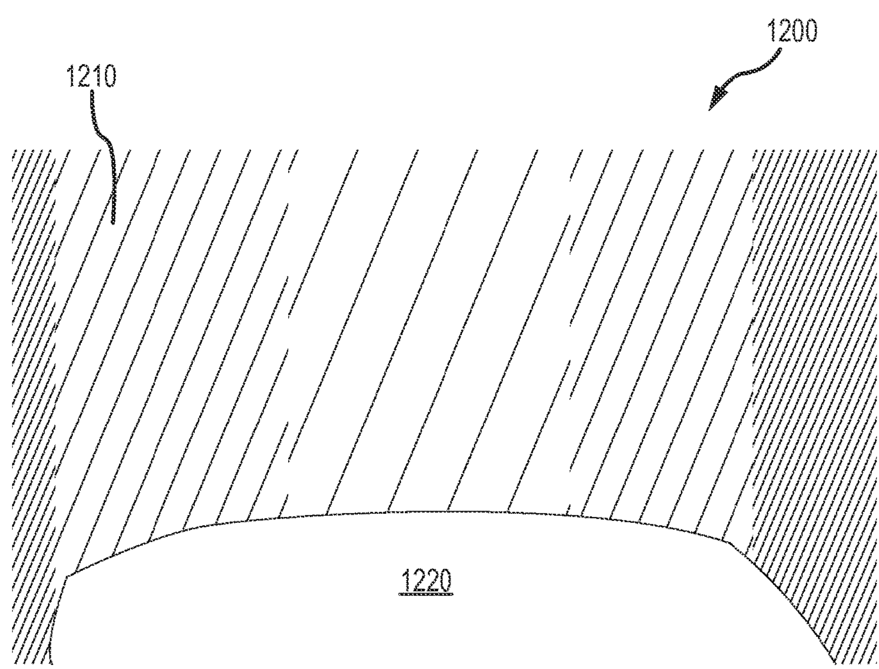
FIGS. 12 and 13 illustrate graphs showing results of use of a pivot irrigator controlled by the techniques taught herein and also a spreadsheet showing the resulting flow rates from a valve pattern used to provide uniform flow as the sprinkler arm is rotated over no spray areas (or exclusion zones, with these two terms used interchangeably herein)
Figure 13:
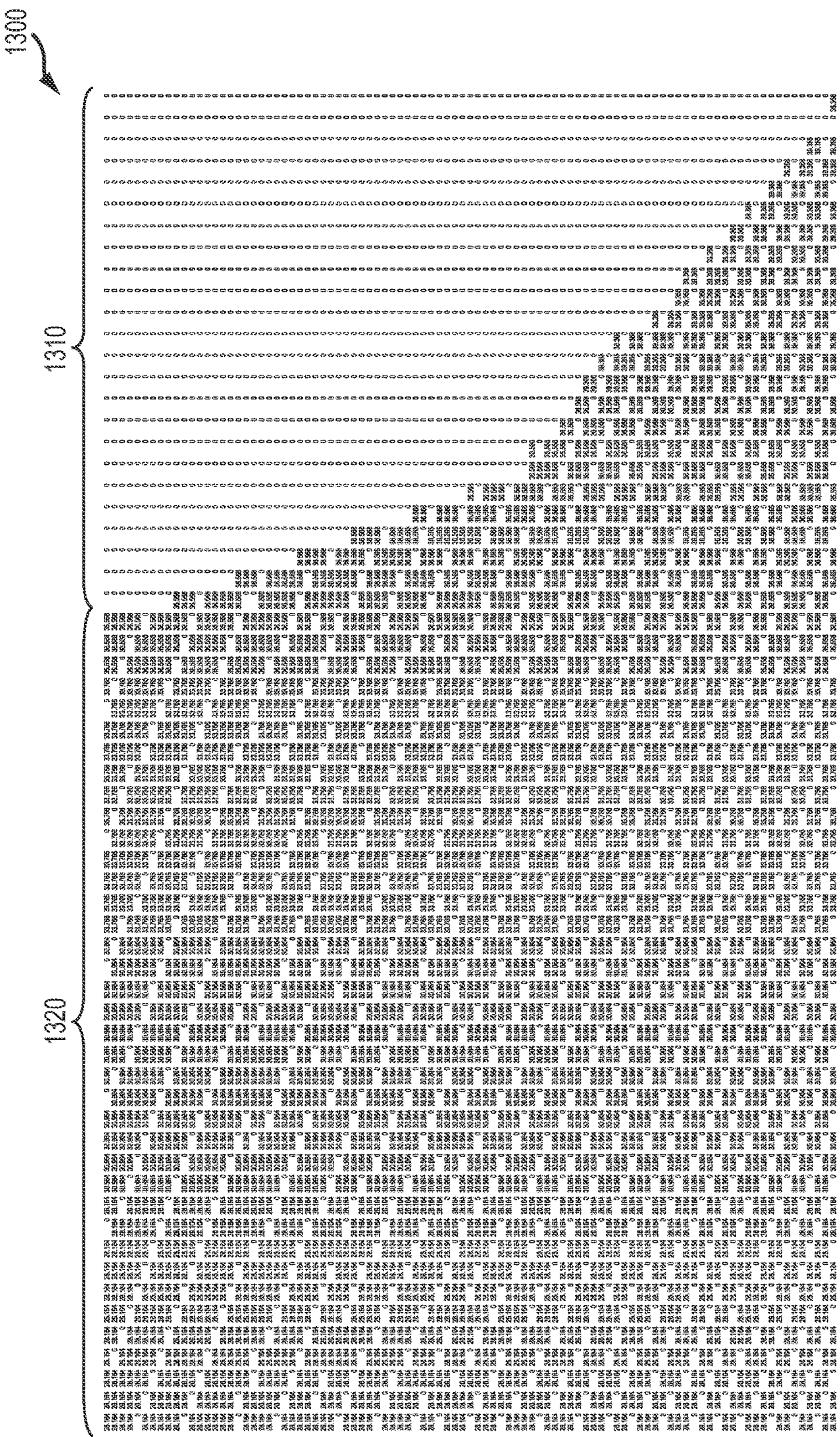

FIGS. 12 and 13 illustrate, respectively, a graph 1200 similar to the graphs 900 and 1100 showing impact of open valve density across a single evenly-shaped no spray area at the edge of the pivot circle and a graph similar to the graph 500 of FIG. 5. In FIG. 12, the graph 1200 shows a no spray area 1220 and a background pattern 1210 illustrating open valve density as the sprinkler arm rotates over the evenly-shaped no spray area at the edge of the pivot circle. FIG. 13 provides a graph 1300 with rows associated with each valve duty cycle and columns showing the flow rate of each valve when it is open or zero when closed. The no spray area or exclusion zone is shown at 1310 and the irrigation zone shown at 1320.

In this distribution representation, the changing intensity is clear by the distance between the black diagonal lines in graph 1200, which represent areas when valves are closed and nozzles are off (not discharging water). In the center of the no spray area 1220, these lines are quite far apart as, for the most part, all available nozzles for use in irrigating are on (or their control valves are open). As one gets closer to the edges of the no spray area 1220, the black lines in the background pattern 1210 get closer and closer together as the number of valves needing to be opened (or nozzles that need to be on) to maintain the desired uniform flow increases.

The spreadsheet representation or graph 1300 of FIG. 13 highlights at a greater level of detail a small part of this overall distribution calculation as a section of the pivot irrigator or sprinkler arm is leaving the no spray area. Each row represents a cycle of valve pulsing, and each column represents a valve (and a nozzle, a pair of nozzles, or a larger set of nozzles). Higher in the spreadsheet 1300 or in upper rows or early cycles, the nozzles are off only once in every 6 or 7 cycles as there is already enough valves closed in the no spray area 1310 to reduce the total flow rate (e.g., the number of available valves nearly matches the number needed to provide a desired output flow from the pivot irrigator). The rate of overridden or closed valves progressively increased in the later cycles as the pivot irrigator or sprinkler arm is rotated to leave the no spray area 1310. Hence, at the bottom of the spreadsheet 1300 or in later cycles, the nozzles are overridden or off once in about every third cycle.

In another tested or simulated use of a center pivot irrigation system, the sprinkler arm was assumed to have 113 valves available along its span or length for use in distributing a desired uniform flow rate. The flow rates per valve were significantly larger than in the previous example such as 3 LPM nozzles up to 48.7 LPM nozzles, and this pivot irrigator was assumed to have a flow range between 12 LPM and 103.9 LPM. The total flow through all nozzles (if all are open) was assumed to be 6363 LPM, and the goal for control was a total output flow of 2850 LPM. The actual fluctuation was determined to be 2769 LPM to 2849 LPM, while an even distribution of water output was maintained across the nozzles (e.g., each obtained an equal proportion of the available irrigation water). To smooth out the flow rate further may involve sacrificing the distribution across smaller capacity or sized nozzles.

Figure 14:
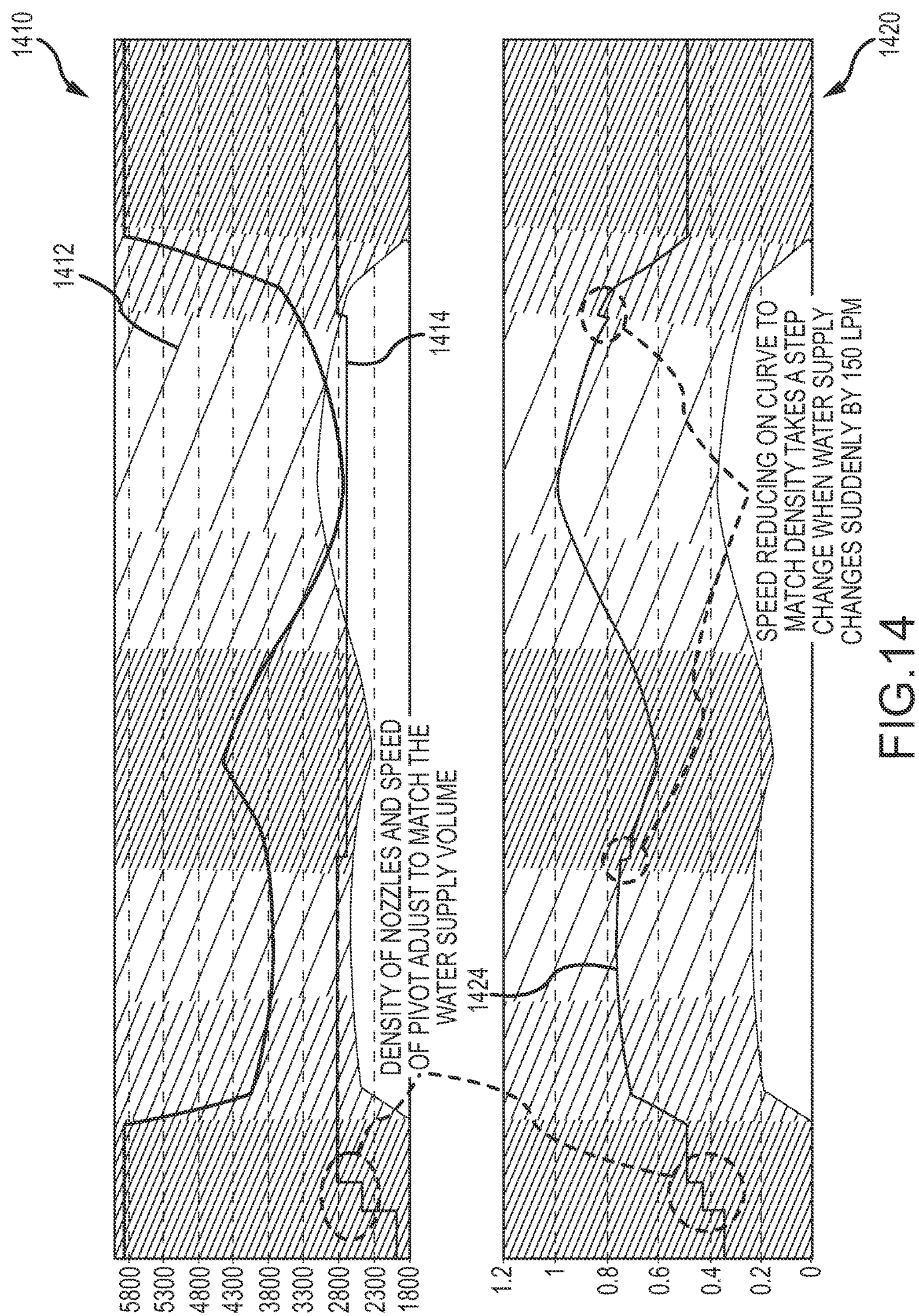
FIG. 14 illustrates a pair of graphs illustrating flow rates and rotation speeds as a sprinkler arm is rotated over a field with an irrigation plan defining an exclusion zone, with FIG. 14 being designed to illustrate the effect on the speed and valve density as the input flow rate of the pivot changes in combination with crossing over the same no spray zone as shown in FIGS. 9 and 10.

FIG. 14 illustrates a pair of graphs 1410, 1420 illustrating flow rates and rotation speeds as a sprinkler arm is rotated over a field with an irrigation plan defining an exclusion zone. Line 1414 of graph 1410 shows the flow rate through the pivot irrigator while line 1424 of graph 1420 shows the rotation speed during the irrigation process. The graphs 1410, 1420 are useful for demonstrating that the control techniques taught herein are useful when flow rates as shown with line 1414 change during irrigation. As seen with line 1424 and background pattern 1412 (showing open valve density), changes in the flow rate 1414 during irrigation is addressed by the controller and its software by varying or modifying both the pivot speed and the nozzle/valve density. These charts or graphs 1410, 1420 highlight some flow changes as well as the impact on speed as the controller adjusts the density of nozzles and speed of the pivot irrigate to match the water supply volume. For example, speed was reduced on curve 1424 to match density 1412 and takes a step change when the water supply suddenly changes by 150 LPM.

Figure 15:
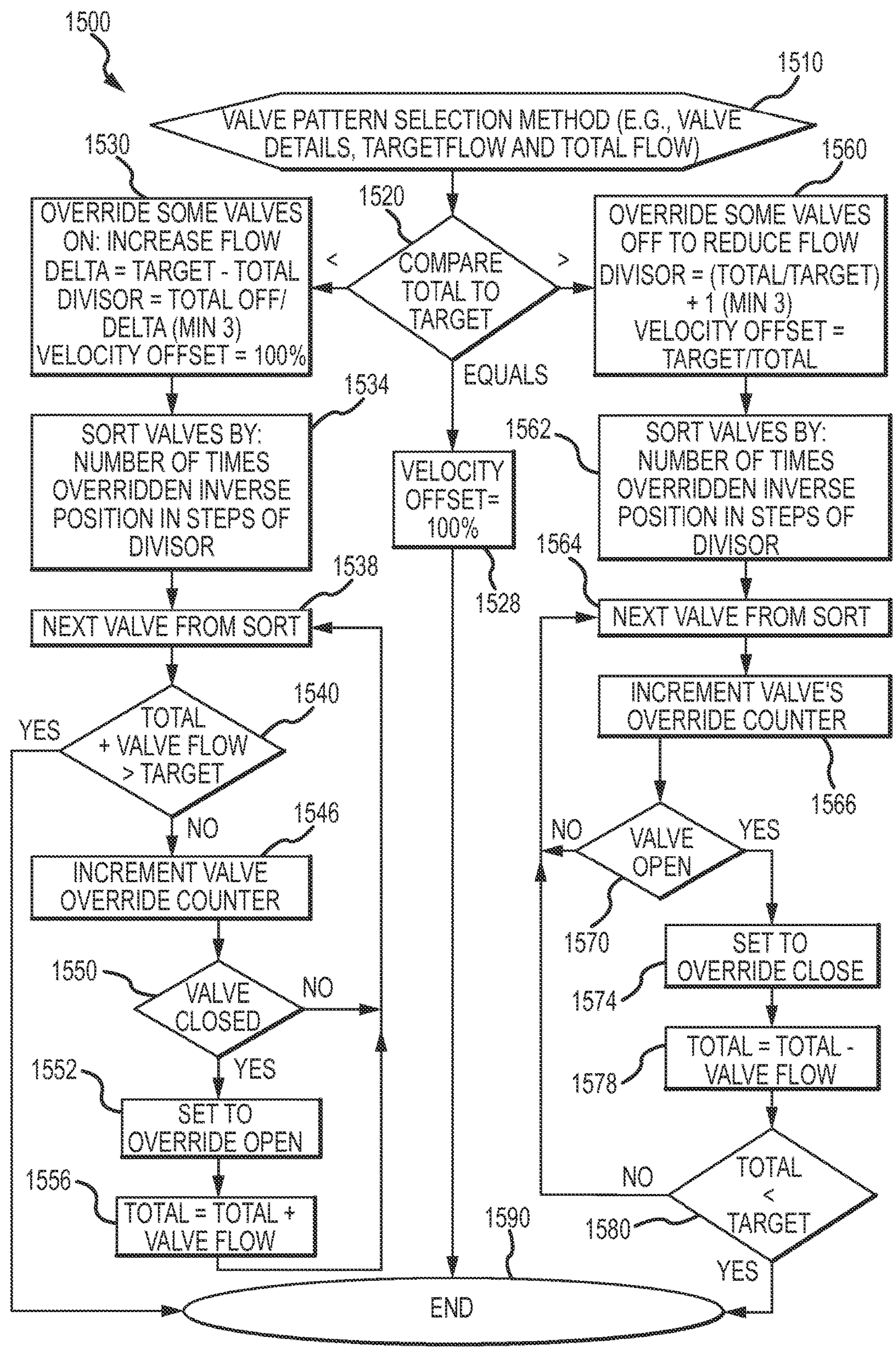
FIG. 15 is a flow diagram of a method of generating a valve pattern for a next duty or operation cycle of an irrigation system, as may be provided as part of the method of FIG. 4.

FIG. 15 is a flow diagram of a method 1500 of generating a valve pattern for a next duty or operation cycle of an irrigation system, as may be provided as part of the method of FIG. 4. The method 1500 starts at 1510 such as with determining, retrieving from memory, or receiving valve detail data (e.g., valve and associated nozzle number and capacity, ordinal location, and actual location along an irrigator arm or pipe span). Step 1510 may also include setting or retrieving a target flow rate through the irrigator or pivot (e.g., through the open or on valves and their associated nozzles), and this step may also include measuring a total flow or determining such flow (e.g., from a pressure reading on the pivot or irrigator).

The method 1500 continues at 1520 with a comparison of the total flow to the target flow. If these are equal (or within some preset range to be "equal" such as within a percentage or within a GPM value such as within 5 to 10 GPM or the like), the method 1500 then proceeds at 1528 with setting the velocity offset at 100 percent and retaining the present valve pattern. The method 1500 may then end at 1590 or be repeated again starting with step 1510.

If at 1520 the total flow is less than the target flow value, the method 1500 continues at 1530 with overriding some valves to be on (or open flow to associated nozzles) to increase flow through the irrigator or pivot. In step 1530, a delta value is obtained by subtracting the total flow value from the target flow value, and then a "divisor" is calculated by dividing the total number of valves that are off in the present (or prior cycle) valve pattern by the delta value (with a minimum delta of three or the like being set in some cases). Then, in step 1530, a velocity offset is set at 100 percent.

Next, the method 1500 continues at 1534 with sorting valves by (a) number of times the valves have been overridden and (b) by an inverse position in steps of the divisor. At step 1538, a next valve from the sort is identified. The method 1500 then continues at 1540 with determining whether or not the sum of the total flow and the identified valve's flow capacity is greater than the target flow. If yes, the method 1500 may end 1590 or continue again at step 1510 for a next duty cycle. If no at 1540, the method 1500 continues at 1546 with incrementing the identified valve's override counter. Then, at 1550, a determination is made as to whether the identified valve is closed. If not closed, method 1500 returns to step 1538 with identifying a next valve from the recent valve sorting at 1534. If the valve is determined to be closed at 1550, the method continues at 1552 with setting the valve to override to open or to be on (e.g., to be opened upon the transmission of control signals to solenoid valves on the pivot or irrigator to implement the new valve opened/closed pattern). Then, at 1556, the total flow value is reset to be the sum of the prior total flow and the capacity flow of the identified valve (or its associated nozzles), and the method 1500 continues with repeating step 1538.

If at step 1520, the total flow was determined to be greater than the target flow, the method 1500 would continue with step 1560 involving overriding some valves to off (close flow to associated nozzles) so as to reduce flow through the pivot or irrigator. Step 1560 may include determining a divisor as the sum of the quotient of the total flow divided by the target flow and one (with the divisor having a minimum value such as three in some embodiments of the method 1500). Then, at step 1562, the valves on the sprinkler arm or span of irrigator pipe are sorted by (a) a number of times the valve has been overridden and (b) an inverse position in steps of the divisor. Then at step 1564, a next valve from the sort of step 1562 is identified. At step 1566, the method 1500 continues with incrementing the identified valve's override counter.

At step 1570, a determination is made as to whether the valve identified in step 1564 is open (e.g., is water flowing through its associated nozzles for irrigation?). If the valve is already closed, the method 1500 continues with identifying a next valve at 1564 from the sort of step 1562. If the valve is open, the method 1500 continues at 1574 with setting override for this valve to close (e.g., to close a solenoid valve associated with one or more nozzles of a known flow capacity). Then, at 1578, the total flow value is updated to be the prior total flow value less the capacity of the valve assigned in step 1574 to be closed during the next duty or operating cycle of the irrigation system. The method 1500 continues at 1580 with a determination of whether the total flow (expected with the new valve pattern) is less than the target flow. If not, additional valves can be identified for closing by repeating step 1564 to identify a possible next valve to close from the sort of step 1564. If yes at 1580, the method 1500 may end at 1590, with the new valve pattern used in a next duty or operating cycle of the irrigation system. The method 1500 may also continue at 1510 with determination of a next valve pattern for an upcoming cycle.

In method 1500, the total flow is the sum of the flow rates of all valves associated with nozzles over an irrigation zone. A total off value is the sum of the flow rates of all valves associated with nozzles that are not over an irrigation zone (e.g., over exclusion zones). An example inverse position in steps of divisor for a sprinkler arm or pipe span with 35 valves (numbered 1 to 35) with divisor of 6 would be: 35, 29, 23, 17, 11, 5, 34, 28, 22, 16, 10, 4, 33, 27, 21, 15, 9, 3, 32, 26, 20, 14, 8, 2, 31, 25, 19, 13, 7, 1, 30, 24, 18, 12, and 6.

Figure 16E:
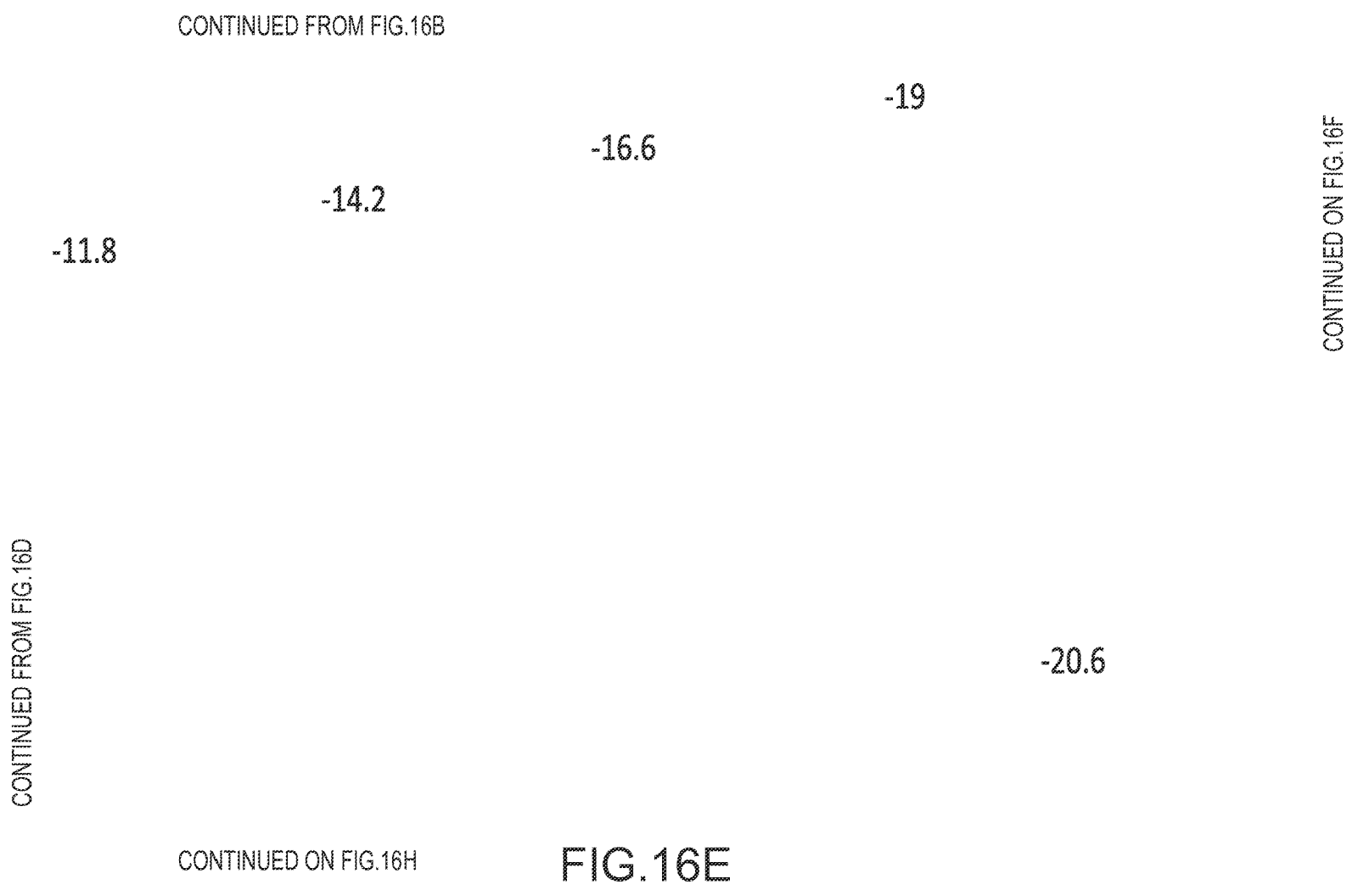
Figure 16F:
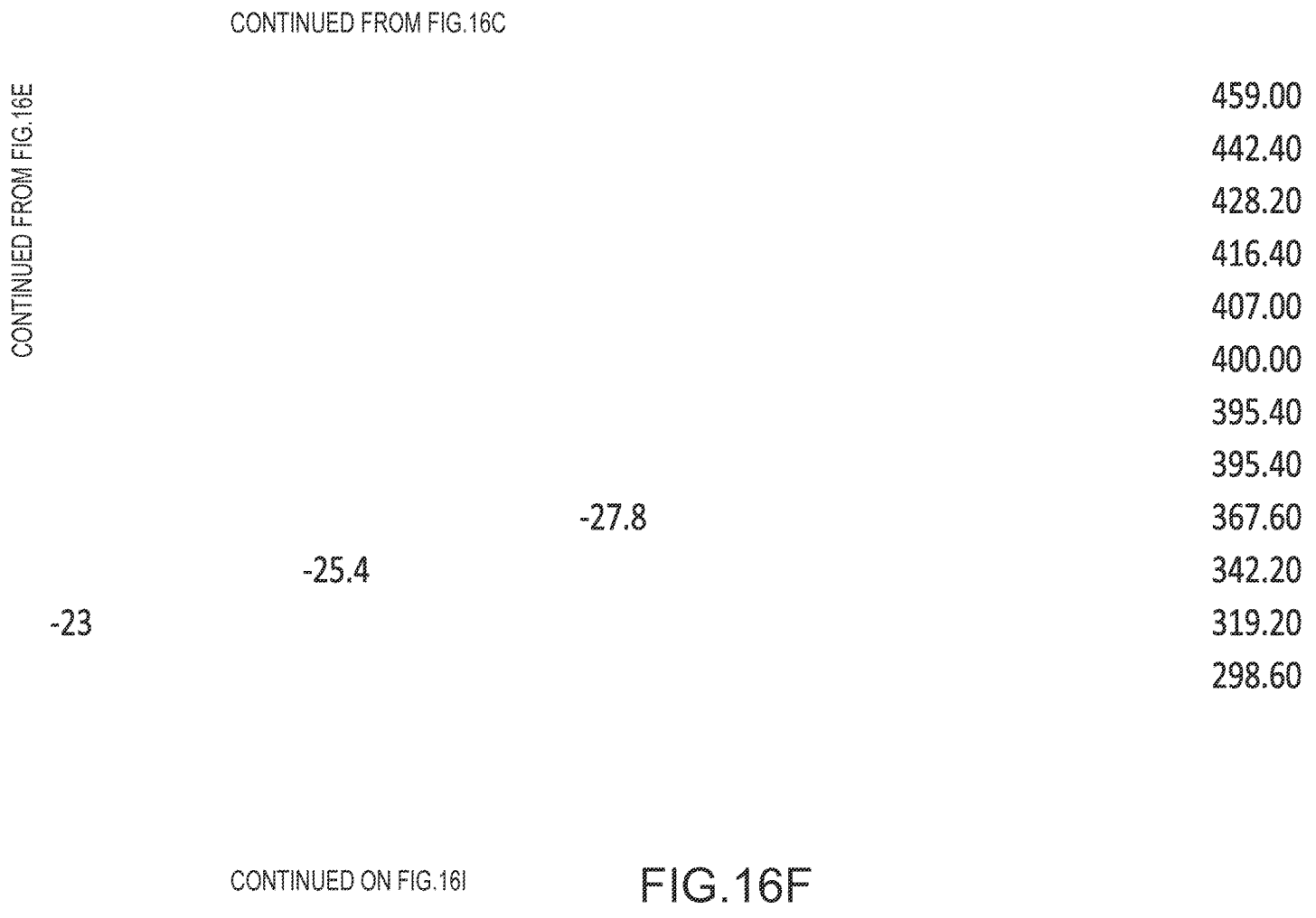
Figure 16O:
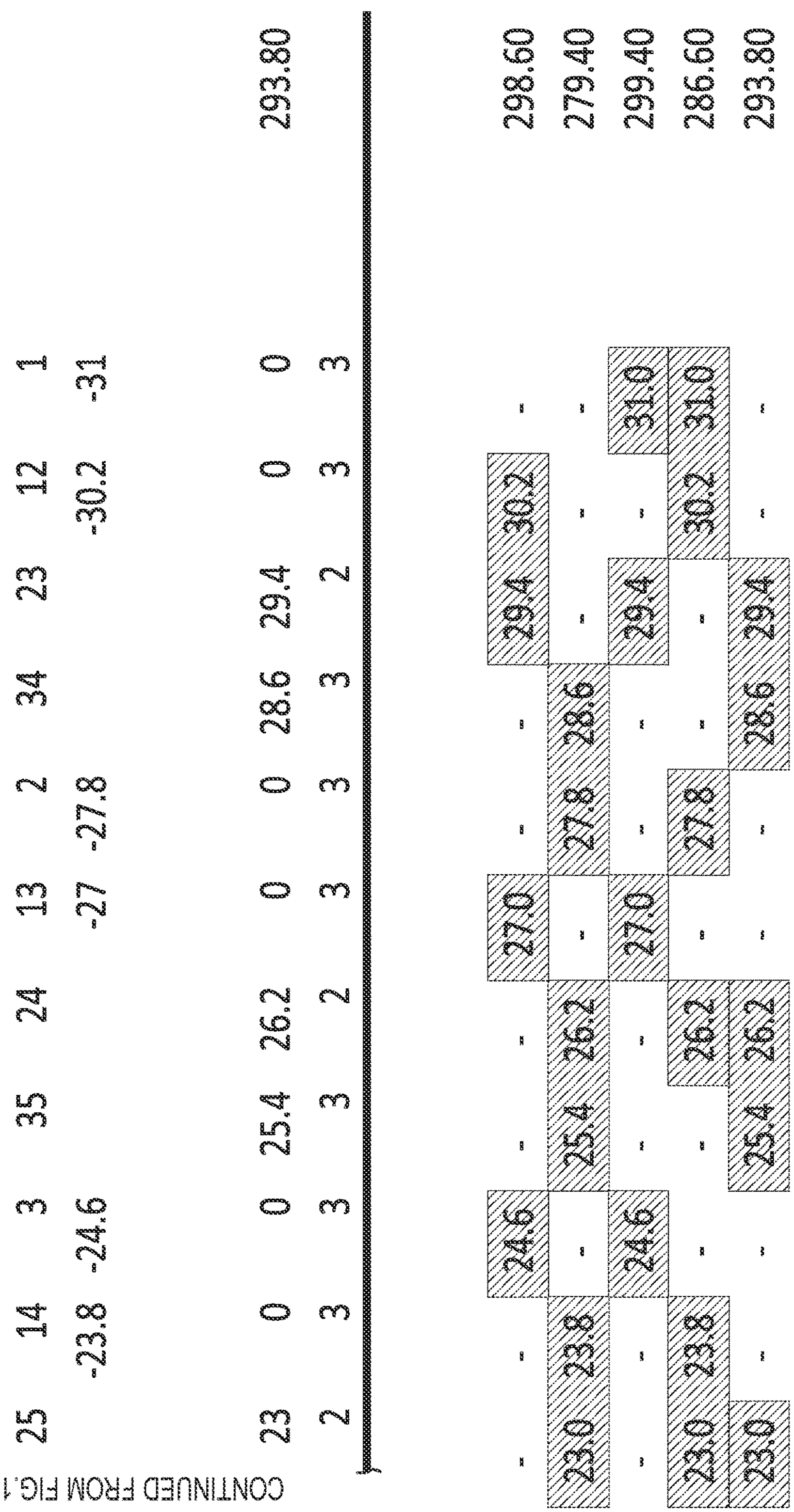

FIGS. 16A-16O are sections of a table or spreadsheet diagram 1600 (arranged with three sections in each row, e.g., with a first row including FIG. 16A, FIG. 16B, and FIG. 16C and each following row including a next three of the figures to make up the table or spreadsheet diagram 1600) showing use of the method of FIG. 15 to generate valve open/close patterns for a number of exemplary cycles (e.g., five cycles are shown). In this example, the irrigator system included 35 valves (numbered 1 to 35), and the differing flow rates (or valve and associated nozzle capacities) are given in the second row of the diagram 1600. These are oversized for the target flow rate of 300 GPM to provide a capacity of 609 GPM, which from step 1560 of the method 1500 of FIG. 15 provides a divisor of 3 and a velocity offset of 49 percent.

As shown for a first cycle, the valves are sorted in inverse order with steps driven by the divisor and provide the total flow of 609 GPM whereas the target flow is 300 GPM for the irrigator. For a first cycle, each valve to be overridden closed is shown in a separate row showing stepwise the reduction in total flow if this set of valves is closed until the total flow is reduced below the target flow down to 298.6 GPM where the selection process stops. In the diagram toward the bottom of the first cycle, a row of resulting flow rates is used to show the flow through each of the valves (with 0 GPM showing the closed valves in this valve pattern for the first cycle) and a row showing that the override counter has been incremented for each of the closed valves.

As shown in the diagram 1600, the valve pattern generation for the second cycle involves valves being firstly sorted by the override counter (so valves that were closed in the last cycle get priority in this next cycle) and then in inverse order with steps driven by the divisor (e.g., by 3 in this example). The diagram 1600 provides a row with a next cycle sort and then which valves are selected for overriding. With this new valve pattern, the diagram provides resulting flow rates along with updated override counter values for each valve. In the second cycle, the valve pattern provides total flow of 279.40 GPM (which may be considered to provide a "constant flow" or a value in a predefined acceptable range about the target flow rate (e.g., within 25 GPM or the like of the target flow rate of 300 GPM)). While the last valve (Valve 35) has now been overridden two cycles in a row, all other valves have only been overridden once.

In diagram 1600, the valve pattern generation for the third cycle involves valves being firstly sorted by the counter and then in inverse divisor-stepped order. This is shown in a next cycle sort row for the third cycle, and the valves that are selected for overriding closed are provided in an override select row. A result flow rates row provides the resulting flow rates for all the valves, which provides a total flow rate of 299.40 GPM (which nearly matches the goal of 300 GPM). The diagram 1600 also provides the new values of each of the override counters, and it can be seen that Valve 35 was opened in the third cycle such that no valves have yet been closed three times and flow is, hence, being distributed among the valves along the span or length of the sprinkler arm.

Next, in diagram 1600, the valve pattern generation for the fourth cycle is illustrated with a next cycle sort row being generated by firstly sorting by the counter values and then in inverse divisor-stepped order. The valves that are selected for overriding closed are provided in an override select row (shown with negative flow rates as their capacities are subtracted from the total capacity of 609 GPM). A resulting flow rates row is provided for each valve along the sprinkler arm to provide a total flow in the cycle of 286.60 GPM, and the new values of the incremented override counters for each valve are provided in the final row for the fourth cycle in the diagram 1600.

Again, in diagram 1600, the valve pattern generation for the fifth cycle is illustrated with a next cycle sort row being generated by firstly sorting by the counter values and then in inverse divisor-stepped order. The valves that are selected for overriding closed in the fifth cycle are provided in an override select row, and this results in the valve-specific flow rates shown in the resulting flow rates row for a total flow of 293.80 GPM. Further, the override counter values are shown for each valve with closed valves being incremented such that these valves receive priority/preference in the next cycle. The diagram 1600 also includes a summary of the valve patterns for each of the exemplary five cycles (which may be used for a cycle of 30 seconds or other useful time period for a particular irrigation system), with the flows given for each open valve in a pattern and with the total flows provided from these five valve patterns ranging from about 280 to 300 GPM based on a target flow rate of 300 GPM for this controlled irrigation system.

The systems described herein, such as center pivot irrigation system 100 of FIG. 1, may be configured to allow a user/farmer to remotely (or locally) monitor and control the irrigation system from any computer, smart phone, tablet, or similar device. The user/farmer can view and monitor irrigation system locations, pivot speed, status (on/off), current voltage usage, current water pressure and/or flow, and more. The user/farmer can remotely control the status (on/off), change the water application rate (prescription) or schedule or irrigation plan, control the material applied, change the direction, and modify or control the pulse rate of the irrigation system. The irrigation system may be configured to provide the user/farmer alerts about system status so they can change the irrigation plan or control irrigators and pumps when they have stopped or encountered errors.

The irrigation system allows the input water to be applied exactly where the user/farmer wants it in their fields. The user/farmer is not limited by the spoke patterns but can perform targeted application of water, fertigation, chemigation, or effluent based on their irrigation plan to apply this "input water" where it matters most. The control of the irrigation system acts to automatically control water application depths based on the irrigation plan, which can be used to account for field variability and crop demands. The control techniques for the irrigation system also control individual nozzles to apply the right depth in the right spot (i.e., not in exclusion zones but, instead, in irrigation zones/areas).

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A center pivot irrigation system, comprising:

a sprinkler arm comprising one or more pipe segments each including a plurality of spaced apart nozzles;

a plurality of towers supporting the sprinkler arm, wherein a drive motor is provided on each of the wheeled towers to drive wheels on the tower to rotate the sprinkler arm about a center pivot axis at a rotation speed;

a water supply providing input water to the sprinkler arm;

a plurality of control valves each provided on the sprinkler arm upstream of a set of the nozzles; and a controller comprising memory and a processor running software code or programs stored in the memory to provide valve operation that, for each of a plurality of sequential valve duty cycles occurring during each full rotation of the sprinkler arm about the center pivot axis, generates a valve pattern defining a group of the nozzles to discharge the input water from the sprinkler arm, wherein the controller is communicatively linked with the control valves and transmits control signals to the control valves causing the control valves associated with the group of nozzles defined by the valve pattern to open, wherein the group of nozzles defined by the valve pattern differs between each pair of the sequential valve duty cycles, wherein the valve duty cycles each have a duration in the range of 20 to 120 seconds, and wherein the controller generates the valve pattern for each of the valve duty cycles to output the input water at a flow rate within a predefined range of flow rates, whereby the input water is output at the flow rate during each of the valve duty cycles even though the valve pattern defining the group of nozzles that are opened differs for each sequential one of the valve duty cycles.

2. The system of claim 1, wherein at least one fourth of the nozzles are closed during each of the valve duty cycles.

3. The system of claim 1, further comprising at least one of a flow meter and a pressure gauge measuring flow rate of the input water and pressure of the input water, wherein the valve pattern is generated for each of the valve duty cycles to provide the output of the input water at the flow rate based on at least one of the measured flow rate and the measured pressure of the input water.

4. The system of claim 1, further comprising a location monitor on the sprinkler arm determining a current geographic location of the sprinkler arm and wherein the controller generates the valve pattern for each valve duty cycle based on the current geographic location of the sprinkler arm.

5. The system of claim 4, wherein the controller generates the valve pattern based on both the current geographic location and an irrigation plan defining an exclusion zone, whereby any of the nozzles determined to be located above the exclusion zone are excluded from the group of nozzles used to discharge the input water from the sprinkler arm.

6. The system of claim 5, wherein the controller generates and transmits a speed control signal to one or more of the drive motors to adjust the rotation speed of the sprinkler arm based on a density of open valves in the valve pattern to maintain a desired application depth of the input water discharged from the sprinkler arm.

7. A center pivot irrigation system, comprising:

a sprinkler arm comprising one or more pipe segments each including a plurality of spaced apart nozzles, wherein the sprinkler arm is rotatable about a center pivot axis at a rotation speed;

a water supply providing input water to the sprinkler arm;

a plurality of control valves each provided on the sprinkler arm upstream of a set of the nozzles;

a controller comprising memory and a processor running software code or programs stored in the memory to provide valve operation that, for each of a plurality of sequential valve duty cycles, generates a valve pattern defining a group of the nozzles to discharge the input water from the sprinkler arm, wherein the controller is communicatively linked with the control valves and transmits control signals to the control valves causing the control valves associated with the group of nozzles to open; and a location monitor on the sprinkler arm determining a current geographic location of the sprinkler arm, wherein the controller generates the valve pattern for each valve duty cycle based on the current geographic location of the sprinkler arm, wherein the controller generates the valve pattern based on both the current geographic location and an irrigation plan defining an exclusion zone, whereby any of the nozzles determined to be located above the exclusion zone are excluded from the group of nozzles used to discharge the input water from the sprinkler arm, wherein the group of nozzles defined by the valve pattern differs for each of the valve duty cycles, wherein the valve duty cycles each have a length selected to be in the range of 20 to 120 seconds, and wherein at least one fourth of the nozzles are closed during each of the valve duty cycles.

8. The system of claim 7, wherein the controller generates and transmits a speed control signal to one or more of the drive motors to adjust the rotation speed of the sprinkler arm based on a density of open valves in the valve pattern to maintain a desired application depth of the input water discharged from the sprinkler arm.

9. The system of claim 7, wherein the controller generates the valve pattern for each of the valve duty cycles to output the input water at a flow rate within a predefined range of flow rates, wherein the system further comprises at least one of a flow meter and a pressure gauge measuring flow rate of the input water and pressure of the input water, and wherein the valve pattern is generated for each of the valve duty cycles to provide the output of the input water at the flow rate based on at least one of the measured flow rate and the measured pressure of the input water.

10. A center pivot irrigation system, comprising:

a sprinkler arm comprising one or more pipe segments each including a plurality of spaced apart nozzles;

a plurality of towers supporting the sprinkler arm, wherein a drive motor is provided on each of the wheeled towers to drive wheels on the tower to rotate the sprinkler arm about a center pivot axis at a rotation speed;

a plurality of control valves each provided on the sprinkler arm upstream of a set of the nozzles; and a controller comprising memory and a processor running software code or programs stored in the memory to provide valve operation that, for each of a plurality of sequential valve duty cycles, generates a valve pattern defining a group of the nozzles to discharge input water from the sprinkler arm, wherein the controller is communicatively linked to the control valves and transmits control signals to the control valves causing the control valves associated with the group of nozzles to open, wherein the controller generates and transmits a speed control signal to one or more of the drive motors to adjust the rotation speed of the sprinkler arm based on a density of open valves in the valve pattern to maintain a desired application depth of the input water discharged from the sprinkler arm, wherein the group of nozzles defined by the valve pattern differs for each of the valve duty cycles that have a duration in the range of 20 to 120 seconds, and wherein at least one fourth of the nozzles are closed during each of the valve duty cycles.

11. The system of claim 10, further comprising at least one of a flow meter and a pressure gauge measuring flow rate of the input water and pressure of the input water, wherein the valve pattern is generated for each of the valve duty cycles to provide the output of the input water at the flow rate based on at least one of the measured flow rate and the measured pressure of the input water.

12. The system of claim 10, further comprising a location monitor on the sprinkler arm determining a current geographic location of the sprinkler arm, wherein the controller generates the valve pattern for each valve duty cycle based on the current geographic location of the sprinkler arm, and wherein the controller generates the valve pattern based on both the current geographic location and an irrigation plan defining an exclusion zone, whereby any of the nozzles determined to be located above the exclusion zone are excluded from the group of nozzles used to discharge the input water from the sprinkler arm.

* * * * *